(12) United States Patent
Yamaguchi

(10) Patent No.: US 12,392,150 B2
(45) Date of Patent: Aug. 19, 2025

(54) BOOTH

(71) Applicant: TOSHIBA TEC KABUSHIKI KAISHA, Tokyo (JP)

(72) Inventor: Masao Yamaguchi, Tokyo (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 138 days.

(21) Appl. No.: 17/944,161

(22) Filed: Sep. 13, 2022

(65) Prior Publication Data

US 2023/0175276 A1   Jun. 8, 2023

(30) Foreign Application Priority Data

Dec. 3, 2021   (JP) .................................. 2021-197080

(51) Int. Cl.
*E04H 1/12*   (2006.01)
*G10K 11/02*   (2006.01)

(52) U.S. Cl.
CPC ............. *E04H 1/125* (2013.01); *G10K 11/02* (2013.01)

(58) Field of Classification Search
CPC .......... E04H 1/125; E04H 1/12; G10K 11/02; Y02A 40/25; E04B 1/99; F01N 1/08; F01N 1/089
USPC .................................. 181/249, 255, 270, 272
See application file for complete search history.

(56) References Cited

U.S. PATENT DOCUMENTS

| | | | | |
|---|---|---|---|---|
| 1,903,983 | A * | 4/1933 | De Bothezat ........... | F24F 7/007 454/341 |
| 2,875,678 | A * | 3/1959 | Shepherd ................ | F24F 7/025 454/355 |
| 2,987,983 | A * | 6/1961 | Solzman .................. | F24F 7/025 415/212.1 |
| 3,110,357 | A * | 11/1963 | Jenn ........................ | F24F 7/025 454/262 |
| 3,158,457 | A * | 11/1964 | Whitfield ................ | F24F 3/167 454/231 |
| 3,302,547 | A * | 2/1967 | Wasserman ............. | F24F 7/025 52/236.1 |

(Continued)

FOREIGN PATENT DOCUMENTS

| | | |
|---|---|---|
| JP | 2002-266443 A | 9/2002 |
| JP | 2005-076405 A | 3/2005 |

(Continued)

*Primary Examiner* — Brian E Glessner
*Assistant Examiner* — Adam G Barlow
(74) *Attorney, Agent, or Firm* — Kim & Stewart LLP

(57) ABSTRACT

A booth includes one or more wall plates surrounding an internal space, a ceiling plate connected to the plates and above the space, and a communication portion connected to either the ceiling plate or an upper part of a wall plate and through which air flows. The communication portion includes area portions arranged along an air flow direction and each having an opening through which the air flows, the area portions including first, second, and third portions in this order from the outside of the booth towards the internal space, and a first area of the opening of the first portion along a surface perpendicular to the air flow direction is smaller than a second area of the opening of the second portion along the surface, and a third area of the opening of the third portion along the surface is smaller than the second area.

19 Claims, 23 Drawing Sheets

(56) References Cited

U.S. PATENT DOCUMENTS

| | | | | |
|---|---|---|---|---|
| 3,611,907 | A * | 10/1971 | Wasserman | E04B 1/8218 |
| | | | | D25/16 |
| 4,120,376 | A * | 10/1978 | Palmer | E04H 1/1238 |
| | | | | 181/204 |
| 5,123,874 | A * | 6/1992 | White, III | E04B 1/34321 |
| | | | | 181/290 |
| 8,650,833 | B1 * | 2/2014 | Polston | F24F 7/02 |
| | | | | 52/95 |
| 10,624,232 | B2 * | 4/2020 | Krietzman | F24F 7/04 |
| 11,212,928 | B2 * | 12/2021 | Lewis, II | H05K 5/0213 |
| 11,259,446 | B2 * | 2/2022 | Lewis, II | H05K 7/20754 |
| 11,549,703 | B2 * | 1/2023 | Haveri | F24F 7/06 |
| 2018/0257098 | A1 * | 9/2018 | Pihlblad | B05B 16/60 |
| 2020/0018060 | A1 * | 1/2020 | Watanabe | E04B 1/34326 |
| 2023/0029778 | A1 * | 2/2023 | Yong | E04B 1/8218 |
| 2023/0175276 | A1 * | 6/2023 | Yamaguchi | G10K 11/02 |
| | | | | 52/39 |

FOREIGN PATENT DOCUMENTS

| | | |
|---|---|---|
| JP | 2020-066858 A | 4/2020 |
| JP | 2020-133357 A | 8/2020 |
| JP | 2020-139300 A | 9/2020 |

* cited by examiner

|  | Difference in sound pressure level with and without a wall plate (dBA) |
|---|---|
| White noise | 22.0 |
| Male voice | 11.9 |
| Female voice | 12.3 |

FIG. 3

BOOTH

CROSS-REFERENCE TO RELATED APPLICATIONS

This application is based upon and claims the benefit of priority from Japanese Patent Application No. 2021-197080, filed Dec. 3, 2021, the entire contents of which are incorporated herein by reference.

FIELD

Embodiments described herein relate generally to booths.

BACKGROUND

A booth having a box-shaped body to provide a personal space is used by an individual such as a worker, a student, or the like.

BRIEF DESCRIPTION OF THE DRAWINGS

FIG. 3 is a table showing the difference in sound pressure level of sound absorption and sound insulation with and without a wall board using the measurement device shown in FIG. 2.

DETAILED DESCRIPTION

In general, according to one embodiment, a booth includes one or more wall plates surrounding an internal space, a ceiling plate connected to the wall plates and above the internal space, and a communication portion connected to either the ceiling plate or an upper part of one of the wall plates and through which air flows between the internal space and an outside of the booth. The communication portion includes a plurality of area portions arranged along an air flow direction and each having an opening through which the air flows. The area portions include at least first, second, and third portions in this order from the outside of the booth towards the internal space. A first area of the opening of the first portion along a surface perpendicular to the air flow direction is smaller than a second area of the opening of the second portion along the surface. A third area of the opening of the third portion along the surface is smaller than the second area.

Hereinafter, certain example embodiments will be described with reference to the drawings. A booth described in this disclosure can be applied to various situations such as, for example, for use as a private room or privacy room. Such a booth can be fixed or installed at various positions such as the inside of an office building, a train station, or on a train. Such a booth or room can be used as a work booth in which a worker or the like works or a student or the like studies. Web conferences and the like can also be held inside the booth. In addition, the booth can be used as a private relaxation room in which a user takes a rest therein. Further, the booth can be used a dressing room used in conjunction with a shower room or as emergency equipment such as a simple toilet booth in the event of a disaster.

First Embodiment

A booth 10 according to a first embodiment will be described with reference to FIGS. 1 to 11.

Figure 1:
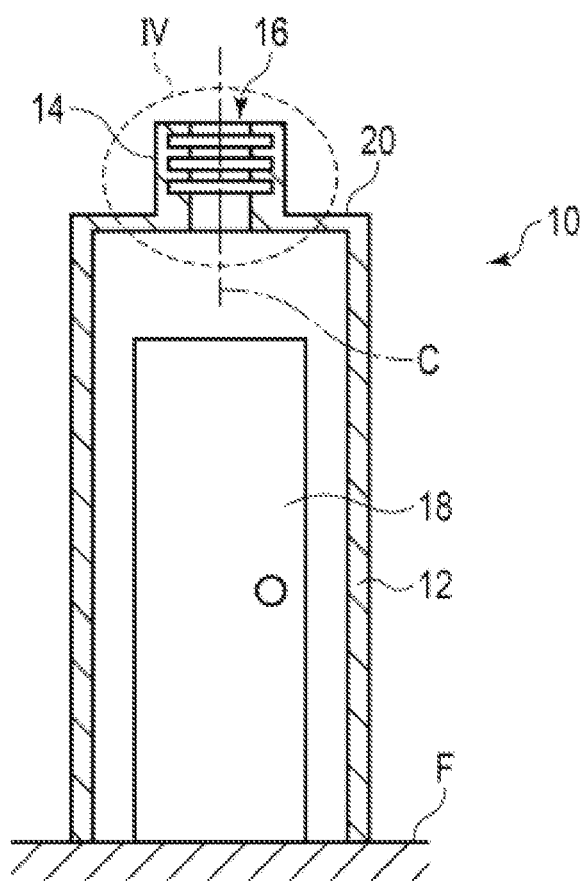
FIG. 1 is a schematic cross-sectional view of a booth according to a first embodiment.

FIG. 1 shows a schematic cross-sectional view of the booth 10 according to the first embodiment. As shown in FIG. 1, the booth 10 is formed in a box shape that is fixed to or otherwise placed on a floor F. When the booth 10 is installed or placed indoors, an upper end of the booth 10 has a height that does not reach an indoor ceiling.

The booth 10 includes a box-shaped booth main body or housing 12 that is fixed to or placed on the floor F, a tubular communication portion 14 that is provided in the booth main body 12 and allows the inside and the outside of the booth main body 12 to communicate with each other, and an area changing portion 16 that is provided in the communication portion 14.

The booth main body 12 is formed in a box shape such as a substantially quadrangular prism shape. The booth main body 12 in other examples may be formed in a substantially polygonal columnar shape or a cylindrical columnar shape. It is preferable that there is no substantial gap between the booth main body 12 and the floor F.

The booth main body 12 has an internal space having a size equal to or larger than a width, a depth, and a height of an expected user such as an adult person. The internal space is sized such that a typical user can enter into the booth main body 12. For example, if the shape of the booth main body 12 is a substantially quadrangular prism shape then the interior volume is arranged to permit the user to be within the booth main body 12. When the booth 10 is used as a work booth, for example, a desk and a chair may be accommodated in the booth main body 12 to provide a workspace or the like, and the booth main body 12 is sized such that the user can get into and out of the chair. In some examples, it may be preferable that the booth main body 12 has a size to permit a plurality of users to be accommodated therein at the same time.

It is generally preferable that the booth main body 12 has a door 18 through which a user enters and leaves the booth 10.

In an example where the booth 10 is light enough to be easily lifted by a user, for example, when the booth 10 is made of cardboard, the door 18 may not be necessary. If the booth 10 is light enough to allow the user to easily lift the booth 10, then the user can simply place the booth 10 at a desired position so as to surround a desk and a chair placed on the floor F.

Here, the booth main body 12 has a wall plate 121 that separates the inside and the outside of the booth main body 12. The wall plate 121 is used as, for example, an outer wall and a partition wall. The wall plate 121 may have a double-layer structure or a multiple-layer structure. In such a case, the wall plate 121 includes an outer wall place that works as an outer wall, and an inner wall plate that works as a partition wall.

Figure 2:
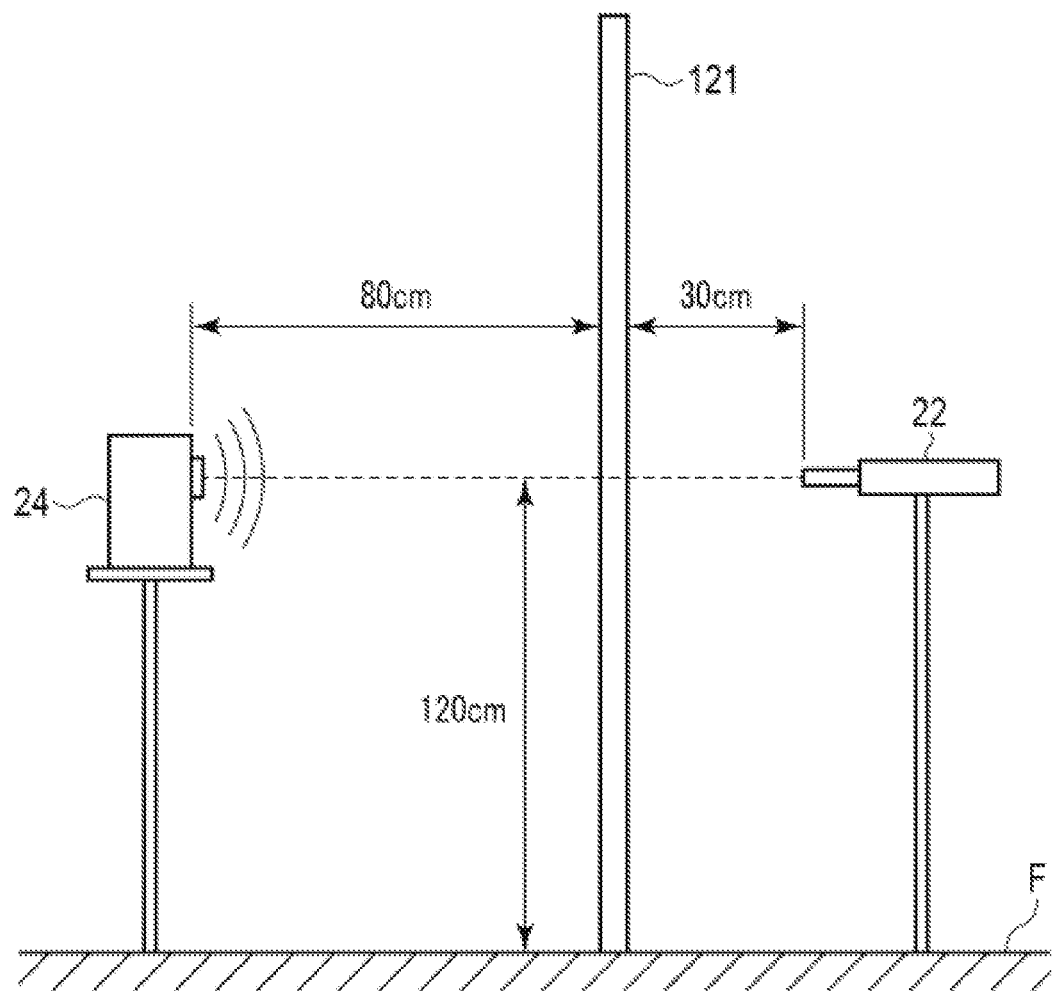
FIG. 2 is a diagram showing a measurement device for measuring the sound absorption and sound insulation effects by a wall plate of a booth according to a first embodiment.

Various measurement methods exist for measuring the properties of the wallboard 121. Here, the sound insulation properties of the wall plate 121 were measured using, for example, a noise meter 22 and a speaker 24 as shown in FIG. 2. In addition, FIG. 3 shows the difference in sound pressure level with and without the wall plate 121 using the noise meter 22 and the speaker 24 shown in FIG. 2.

As shown in FIG. 2, the microphone of the noise meter 22 was installed at a height of 120 cm from the floor surface F and at a distance of 30 cm away from the wall plate 121. The speaker 24 was installed at a height of 120 cm from the floor surface F and at a distance of 80 cm away from the wall plate 121. The microphone and the speaker 24 of the noise meter 22 face each other with a distance corresponding to 110 cm and the thickness of the wall plate 121.

The male voice emitted from the speaker 24 shown in FIG. 2 has the same content, the same loudness, and the same frequency range regardless of the presence or absence of the wall plate 121, and is within a frequency range corresponding to a human voice in daily (normal) conversation. Similarly, a female voice is a voice having the same content, the same loudness, and the same frequency range regardless of the presence or absence of the wall plate 121, and is similarly in a frequency range corresponding to a human voice in daily (normal) conversation.

As shown in FIG. 3, a difference in sound pressure level measured by the sound level meter 22 occurred depending on the presence/absence of the wall plate 121. In the case of "presence" where the wall plate 121 is present, the sound pressure level is lower than that in the case of "absence" where the wall plate 121 is not present. Since the sound pressure level difference exists, it can be seen that the wall plate 121 used in the booth main body 12 of the booth 10 provides sound absorption and sound insulation by the presence of the wall plate 121 for each of white noise, a male voice, and a female voice. That is, the booth 10 using the wall plate 121 absorbs or insulates sounds emitted outside the booth main body 12 by the wall plate 121.

As shown in FIG. 1, the booth main body 12 is formed into a quadrangular cylindrical shape by four wall plates 121, for example. These four wall plates 121 may be integrated with one another or may be separate bodies.

In the present embodiment, the booth main body 12 has a ceiling portion 20 above the wall plate 121 of the booth main body 12. The ceiling portion 20 is formed of, for example, a wall plate having the same material and the same thickness as the wall plate 121. The ceiling portion 20 may be formed of a material different from that of the wall plate 121.

The ceiling portion 20 includes the communication portion 14. The communication portion 14 is provided, for example, at the center of the ceiling portion 20. It is also preferable that the communication portion 14 is provided at a position close to any of the four wall plates 121 of the booth main body 12 on the end side away from the center of the ceiling portion 20.

In the present embodiment, the communication portion 14 is formed in a tubular shape. The communication portion 14 of this example penetrates the ceiling portion 20 in the vertical direction. Thus, the communication portion 14 allows for communication between the inside and the outside of the booth main body 12. The communication portion 14 is formed in a tubular shape having an appropriate shape such as a cylindrical shape or a polygonal tubular shape. A space between the ceiling portion 20 and the communication portion 14 is sealed without a gap.

Figure 4:
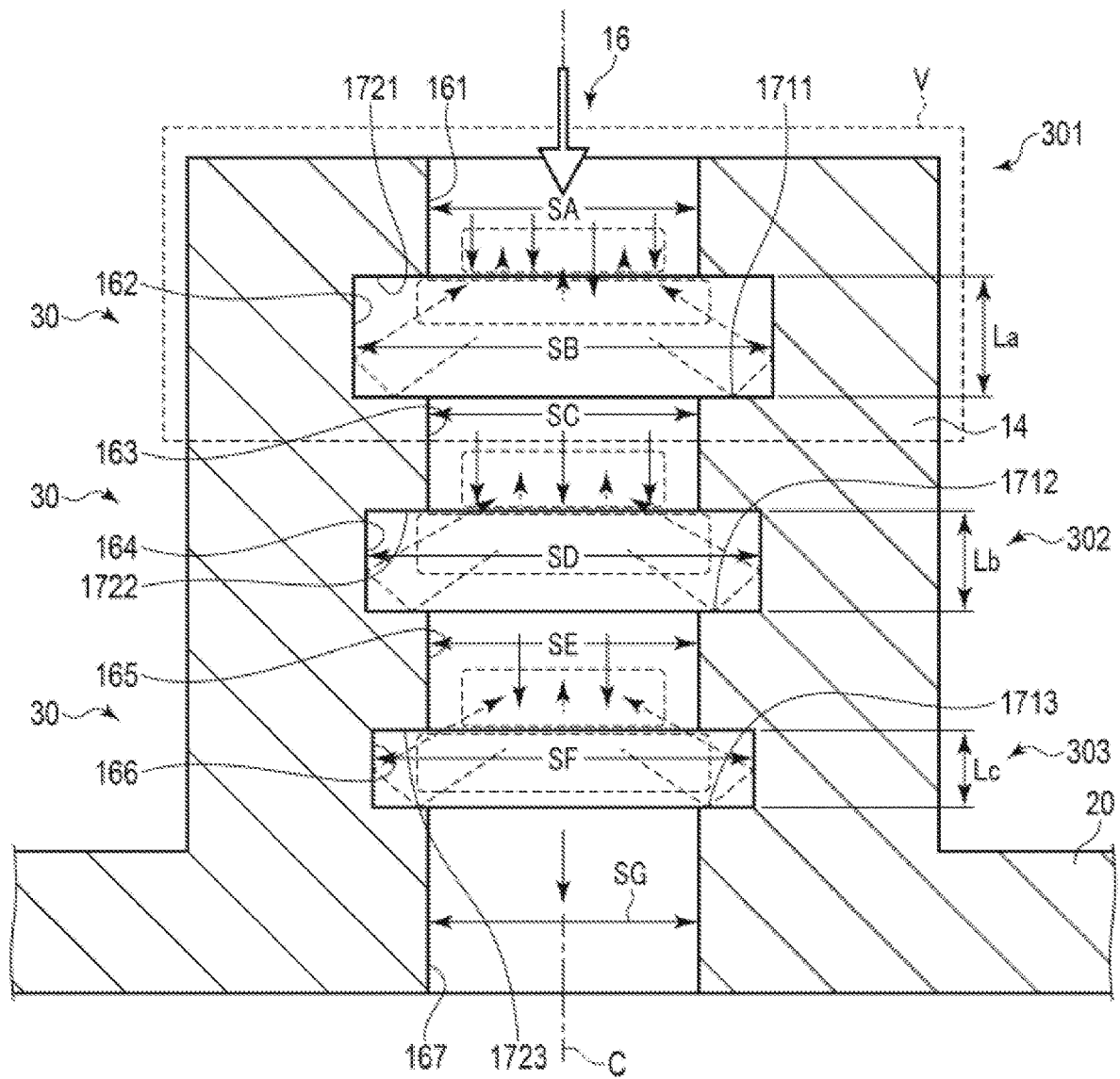
FIG. 4 is a schematic cross-sectional view illustrating a communication portion and an area changing portion of a booth indicated by region IV in FIG. 1.

As shown in FIG. 4 (depicting region IV of FIG. 1), an area changing portion 16 is provided on the inner wall of the cylindrical communication portion 14 along a direction intersecting a certain surface (for example, a surface parallel to the floor F) to change the volume (space) inside the communication portion 14, for example, in stepwise increments a plurality of times. The communication portion 14 and the area changing portion 16 are integrally formed of, for example, a wall plate material having the same thickness and composition as the wall plate 121. The communication portion 14 and the area changing portion 16 may be formed of a material different from that of the wall plate 121.

The area changing portion 16 can be formed such that the spaces inside and the outside of the booth main body 12 are connected to one another in manner to permit a viewer to look from the inside to the outside of the booth main body 12 and vice versa. That is, the area changing portion 16 is formed such that one end thereof can be seen from the other end. Therefore, the inside or outside of the booth 10 can be seen from the outside or the inside through the area changing portion 16.

However, the area changing portion 16 attenuates the sound pressure of a sound that is input to one end of the area changing portion 16 along the flow direction of air and output from the other end. It is assumed that air flows generally from the outside to the inside of the booth main body 12 through the area changing portion 16. In such a case, the area changing portion 16 includes: a first area portion 161 having an area SA, a second area portion 162 having an area SB larger than the area SA, a third area portion 163 having an area SC smaller than the area SB, a fourth area portion 164 having an area SD larger than the area SC, a fifth area portion 165 having an area SE smaller than the area SD, a sixth area portion 166 having an area SF larger than the area SE, and a seventh area portion 167 having an area SG smaller than the area SF, in order along the air flow direction. The first to seventh area portions 161 to 167 are disposed parallel to the floor F and arranged along the air flow direction.

In the present embodiment, each of the first to seventh area portions 161 to 167 corresponds to a disk-shaped or cylindrical volume each sharing a common central axis C.

In the area changing portion 16 of the present embodiment shown in FIGS. 1 and 4, the air flow direction can be a direction from the upper side to the lower side and a direction from the lower side to the upper side. That is, the air flows from the outside of the booth 10 to the inside of the booth main body 12 through the communication portion 14, and also flows from the inside of the booth main body 12 to the outside of the booth 10. In the present embodiment, the seventh area portion 167 can be disposed in the ceiling portion 20, and the first area portion 161 is disposed farthest away from the ceiling portion 20.

The area changing portion 16 includes, for example, a plurality of reflection surfaces 1711, 1712, and 1713 (also referred to as first reflection surfaces 1711, 1712, 1713) that generate a reflected sound by which a part of a sound entering the booth main body 12 from the outside of the booth main body 12 through the area changing portion 16 is reflected back toward the outside of the area changing portion 16. For this reason, a part of the sound traveling to enter the booth main body 12 through the area changing portion 16 is reduced by the reflection surfaces 1711, 1712, 1713. For this reason, the reflected sound and the traveling sound may interfere with each other, and the sound pressure of the sound entering the inside of the booth main body 12 from the outside of the booth main body 12 is weakened.

In addition, the area changing portion 16 includes, for example, a plurality of reflection surfaces 1721, 1722, and 1723 (also referred to as second reflection surfaces 1721, 1722, and 1723) that generate a reflected sound by which a part of a sound going out of the booth main body 12 from the inside of the booth main body 12 through the area changing portion 16 is reflected back toward the inside of the area changing portion 16. For this reason, a part of the sound traveling to go out of the booth main body 12 through the area changing portion 16 is reduced by the reflection surfaces 1721, 1722, 1723 of the area changing portion 16. Therefore, the reflected sound and the traveling sound may interfere with each other, and the sound pressure of the sound going out from the inside of the booth main body 12 to the outside of the booth 10 is weakened.

The reflection surfaces 1711, 1721 are in the second area portion 162, the reflection surfaces 1712, 1722 are in the fourth area portion 164, and the reflection surfaces 1713, 1723 are in the sixth area portion 166. In the present embodiment, each of the reflection surfaces 1711, 1712, 1713, 1721, 1722, 1723 is formed by a combination of a surface parallel to the floor surface F and a surface adjacent to the surface and parallel to the center axis C and orthogonal to the floor surface F. The reflection surfaces 1711, 1712, 1713, 1721, 1722, 1723 may be formed of one surface or a plurality of surfaces. The reflection surface 1711, 1712, 1713, 1721, 1722, 1723 may be formed as a curved surface.

Figure 5:
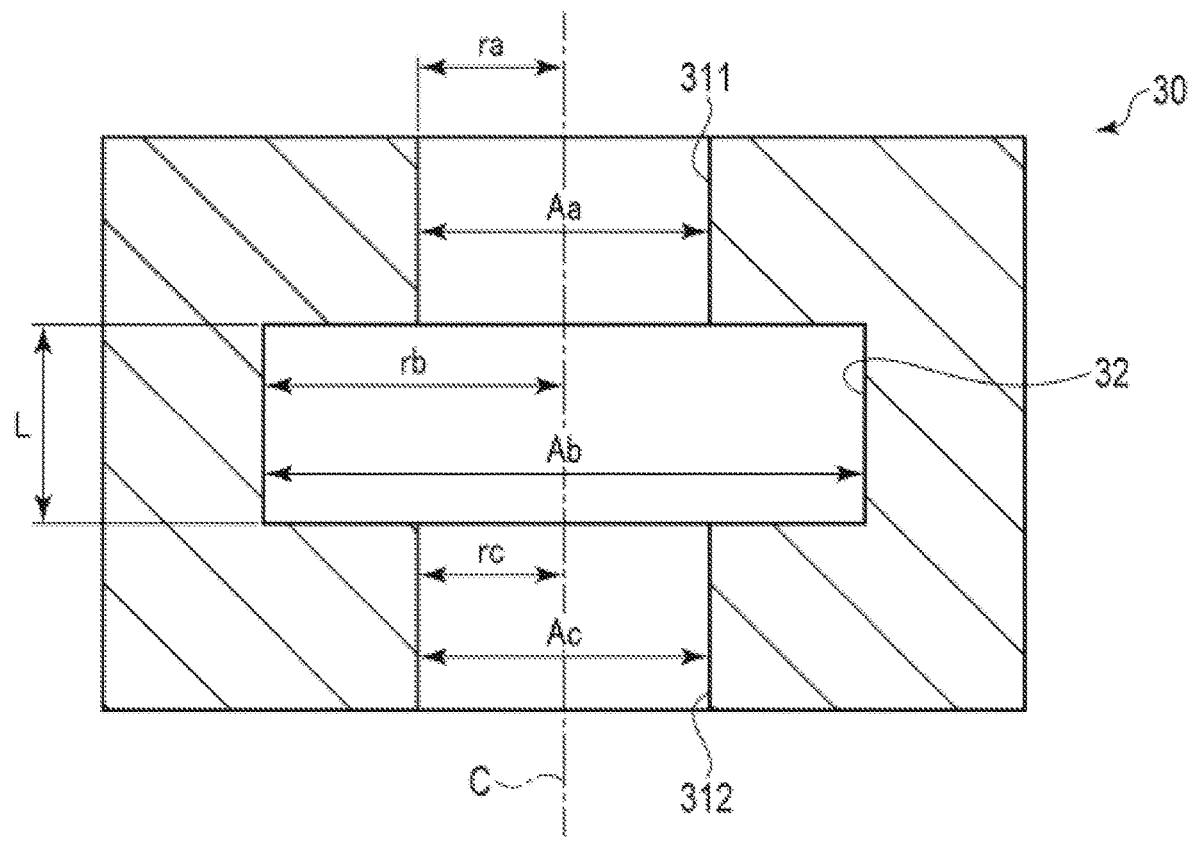
FIG. 5 is a schematic cross-sectional view showing a cylindrical body which is a part of the area changing portion of the booth shown in FIG. 4.

FIG. 5 (depicting a region V of FIG. 4) shows a cylindrical body 30, which is a part of the communication portion 14 and the area changing portion 16 indicated by region V in FIG. 4. It is assumed that the air flow direction in the cylindrical body 30 is a direction from the upper side to the lower side in FIG. 5. At this time, the inner wall of the cylindrical body 30 corresponding to a part of the area changing portion 16 has a flow passage having a first small area portion 311, a large area portion 32, and a second small area portion 312 along the air flow direction.

At the boundary between the first small area portion 311 and the large area portion 32 of the cylindrical body 30 to form a step portion shown in FIG. 5, and at the boundary between the large area portion 32 and the second small area portion 312 to form another step portion, the medium in which the sound propagates changes. Therefore, the acoustic impedance of the sound changes in the step portion.

The area of the first small area portion 311 of the cylindrical body 30 shown in FIG. 5 in a direction orthogonal to the air flow direction is denoted by Aa, and the area of the second small area portion 312 in the direction orthogonal to the air flow direction is denoted by Ac. In this case, the area Aa=Ac. The area of the large area portion 32 in the direction orthogonal to the air flow direction is formed to be an area Ab larger than each of the first small area portion 311 and the second small area portion 312. When λ is a wavelength of sound, an area ratio m=Ab/Aa=Ab/Ac between the areas Aa and Ac of the first and second small area portions 311 and 312 and the area Ab of the large area portion 32, a coefficient k=2π/λ, and L is a length of the large area portion 32 along the air flow direction (that is, the distance between the first small area portion 311 and the second small area portion 312), an attenuation amount (dB) of sound is expressed by the following Formula (1).

Attenuation amount (dB)=10 log$_{10}${1+1/4(m−1/m)$^2$ sin$^2$KL}  [Formula 1]

From the parameters of Formula (1), the attenuation amount of sound passing through the cylindrical body 30 depends on the length L and the area ratio m of the large area portion 32. In a case where the area ratio m increases, the attenuation amount of the sound increases. It is preferable that the difference in size between the areas Aa and Ac of the first and second small area portions 311 and 312 and the area Ab of the large area portion 32 is large. Therefore, in order to attenuate the sound, it is preferable that the areas Aa and Ac of the first and second small area portions 311 and 312 are as small as possible and the area Ab of the large area portion 32 is as large as possible.

On the other hand, based on the parameter of Formula (1), the attenuation amount of the sound passing through the cylindrical body 30 does not depend on the shapes of the first small area portion 311, the second small area portion 312, and the large area portion 32. Therefore, the shapes of the first small area portion 311, the second small area portion 312, and the large area portion 32 can be appropriately set. Here, in order to simplify the description, an example in which a disk-like or columnar space spreads around the common central axis of the first small area portion 311, the large area portion 32, and the second small area portion 312 will be described. That is, in the present embodiment, the first and second small area portions 311 and 312 of the cylindrical body 30 are formed in a columnar shape or a disk shape, and the large area portion 32 of the cylindrical body 30 is formed in a columnar shape or a disk shape.

Figure 6:
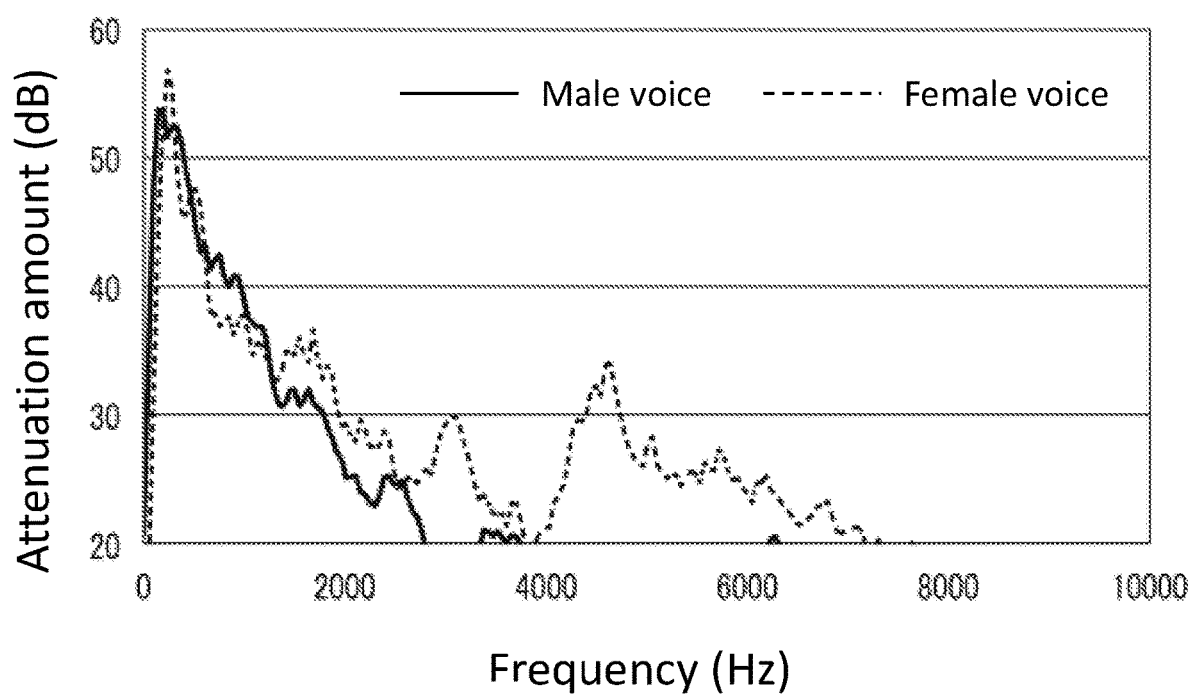
FIG. 6 is a diagram illustrating the relationship between the frequency of a male voice and a female voice and sound pressure level.

FIG. 6 shows a relationship between frequency (Hz) and sound pressure level (dB) of a general male voice and a general female voice. A human audible sound range is generally about 20 Hz to 20000 Hz. Frequencies of human voices in daily conversations are considered to be about 250 Hz to 4000 Hz. As shown in FIG. 6, the frequencies of male voices having an appropriate sound level range from 20 Hz to 4000 Hz, and the frequencies of female voices having an appropriate sound level range from 20 Hz to 7000 Hz. For this reason, in the present embodiment, a sound having frequencies in a range from 20 Hz to 7000 Hz will be addressed.

Figure 7:
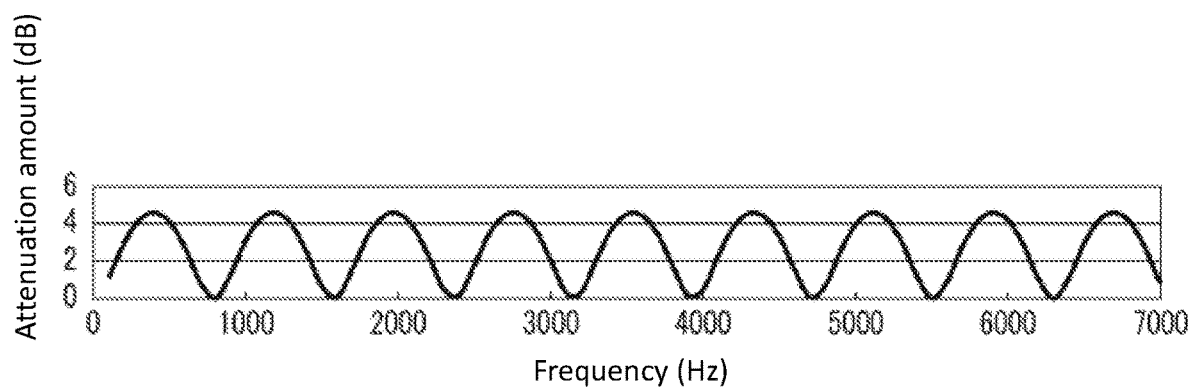
FIG. 7 is a graph showing an attenuation amount of sound within a predetermined frequency range in a state of condition 1 of the cylindrical body shown in FIG. 5.
Figure 8:
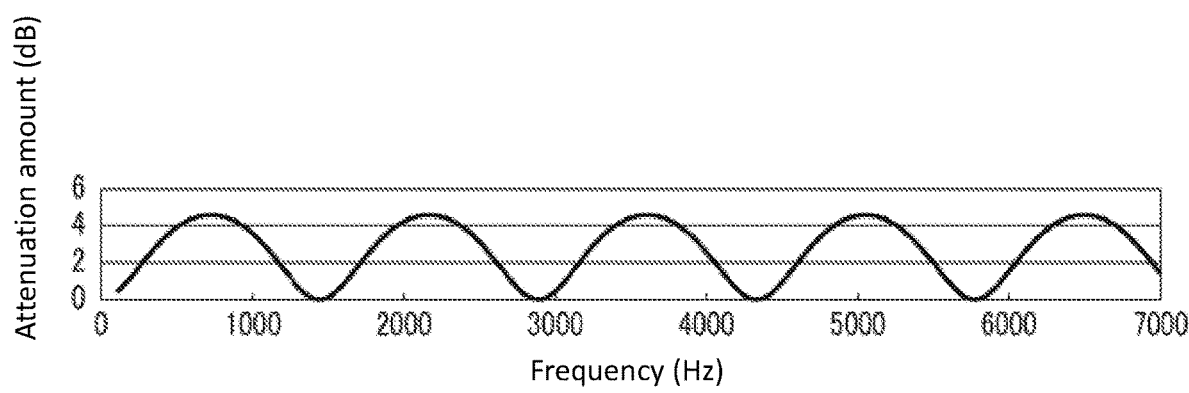
FIG. 8 is a graph showing an attenuation amount of sound within a predetermined frequency range in a state of condition 2 of the cylindrical body shown in FIG. 5.
Figure 9:
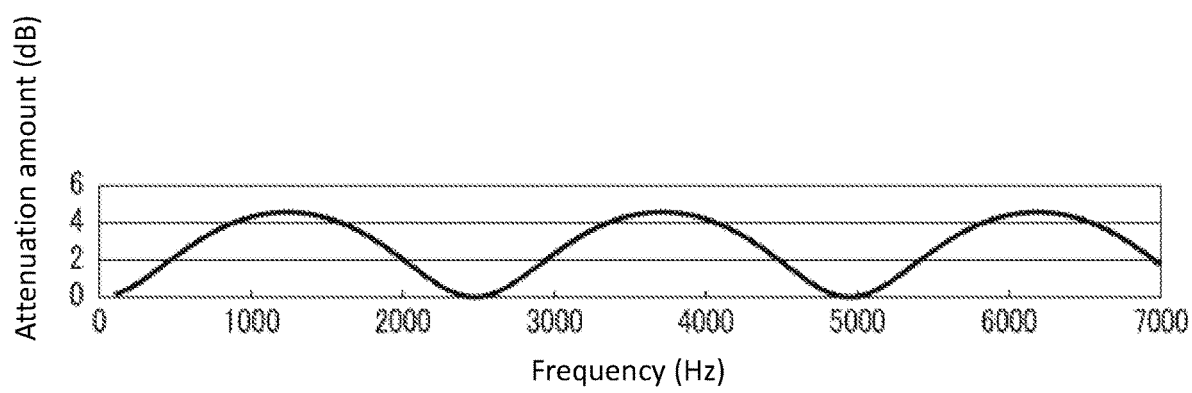
FIG. 9 is a graph showing an attenuation amount of sound within a predetermined frequency range in a state of condition 3 of the cylindrical body shown in FIG. 5.

FIGS. 7 to 9 show examples of simulation results of attenuation amounts (dB) of sound passing through the cylindrical bodies 30 under the following conditions 1, 2, and 3 at frequencies in the range from 20 Hz to 7000 Hz.

As the condition 1, the radiuses ra and rc of the first and second small area portions 311 and 312 of the cylindrical body 30 shown in FIG. 5 are set to 0.4 m, the radius rb of the large area portion 32 is set to 0.9 m, and the length L (La) of the large area portion 32 is set to 0.22 m. Under this condition, as shown in FIG. 7, the attenuation amount (dB) of sound became 0 in the vicinity of 800 Hz and n times thereof (n is a natural number). That is, the cylindrical body 30 (i.e., the first attenuating portion 301 in FIG. 4) under the condition 1 does not attenuate sounds at frequencies substantially 800 Hz and n times that frequency at frequencies from 20 Hz to 7000 Hz, but attenuates sounds at the other frequencies. In other words, in the cylindrical body 30 of the condition 1, the attenuation amount of a sound at a particular frequency and the frequencies of n times (n is a natural number) the particular frequency is smaller than that of a sound at the other frequencies.

As the condition 2, the radiuses ra and rc of the first and second small area portions 311 and 312 of the cylindrical body 30 are set to 0.4 m, the radius rb of the large area portion 32 is set to 0.8 m, and the lengths L (Lb) of the large area portion 32 is et to 0.12 m. Under this condition, as shown in FIG. 8, the attenuations (dB) in the vicinity of the substantially 1450 Hz and n times (n is a natural number) thereof were 0. That is, the cylindrical body 30 (i.e., the first attenuating portion 302 in FIG. 4) under the condition 2 does not attenuate sounds at frequencies substantially 1450 Hz and n times that frequency at frequencies from 20 Hz to 7000 Hz, but attenuates sounds at the other frequencies.

As the condition 3, the radiuses ra and rc of the first and second small area portions 311 and 312 of the cylindrical body 30 are set to 0.4 m, the radius rb of the large area portion 32 is set to 0.7 m, and the lengths L (Lc) of the large area portion 32 is set to 0.07 m. Under this condition, as shown in FIG. 9, the attenuations (dB) in the vicinity of the substantially 2450 Hz and n times (n is a natural number) thereof were 0. That is, the cylindrical body 30 (i.e., the first attenuating portion 303 in FIG. 4) under the condition 3 does not attenuate sounds at frequencies substantially 2450 Hz and n times that frequency at frequencies from 20 Hz to 7000 Hz, but attenuates sounds at the other frequencies.

In this manner, a sound is input to the first small area portion 311 of each cylindrical body 30, and then output from the second small area portion 312 after being attenuated at various frequencies except for a predetermined frequency. Therefore, each of the cylindrical bodies 30 (i.e., the first to third attenuating portions 301, 302, and 303) under the above-described conditions 1-3 exhibits the effect of attenuating the sound pressure level.

The radius ra of the first small area portion 311 and the radius rc of the second small area portion 312 of the cylindrical body 30 under each of the conditions 1, 2, and 3 are the same. This is the same as the first area portion 161, the third area portion 163, the fifth area portion 165, and the seventh area portion 167 of the area changing portion 16. Therefore, the second small area portion 312 of the cylindrical body 30 (i.e., the first attenuating portion 301) under the condition 1 and the first small area portion 311 of the cylindrical body 30 (i.e., the second attenuating portion 302) under the condition 2 are integrated or joined together along the air flow direction, and the second small area portion 312 of the cylindrical body 30 (i.e., the second attenuating portion 302) under the condition 2 and the first small area portion 311 of the cylindrical body 30 (i.e., the third attenuating portion 303) under the condition 3 are integrated or joined together along the air flow direction, and thereby forming the area changing portion 16 as shown in FIG. 4.

In the area changing portion 16, the area SB of the second area portion 162, the area SD of the fourth area portion 164, and the area SF of the sixth area portion 166 corresponding to the three large area portions 32 of the cylindrical body 30 are different from each other.

The length L under the condition 1 corresponds to the distance La for the second area portion 162 of the area changing portion 16. The length L under the condition 2 corresponds to the distance Lb for the fourth area portion 164 of the area changing portion 16. The length L under the condition 3 corresponds to the distance Lc for the sixth area portion 166 of the area changing portion 16.

In the area changing portion 16, the lengths La, Lb, Lc of the second area portion 162, the fourth area portion 164, and the sixth area portion 166 corresponding to the three large area portions 32 of the cylindrical body 30 are different from each other. That is, a distance La between the first area portion 161 and the third area portion 163, a distance Lb between the third area portion 163 and the fifth area portion 165, and a distance Lc between the fifth area portion 165 and the seventh area portion 167 are different from each other.

As described above, the area changing portion 16 is formed as an aggregate of different cylindrical bodies 30 forming an air flow passage.

In the present embodiment, the area changing portion 16 has the first reflection surfaces 1711, 1712, 1713 that reflect a part of the sound entering the booth main body 12 from the outside of the booth main body 12 through the area changing portion 16 to the outside of the booth main body 12 so that the change in acoustic impedances is increased. In addition, since the area changing portion 16 includes the second reflection surfaces 1721, 1722, 1723 that reflects a part of the sound that is going out of the booth main body 12 from the inside of the booth main body 12 through the area changing portion 16 to the inside of the booth main body 12 so that the change in acoustic impedances is increased. In order to increase the change in acoustic impedance, it is preferable that the areas of the first reflection surfaces 1711, 1712, 1713 and the second reflection surfaces 1721, 1722, 1723 are as large as possible. As shown in FIG. 4, the direction of the first reflection surfaces 1711, 1712, 1713 faces the outside of the booth main body 12 in the area changing portion 16. As shown in FIG. 4, the second reflection surfaces 1721, 1722, 1723 are directed toward the inside of the booth main body 12 within the area changing portion 16.

Next, the operation of the booth 10 according to this exemplary formed as described above will be described.

The area changing portion 16 can be seen from one end to the other end, and does not block the flow of air between the inside and the outside of the booth main body 12. For example, in a case where the booth 10 is used indoors, a user in the booth main body 12 can see the indoor ceiling through the area changing portion 16. Therefore, air flows between the inside and the outside of the booth main body 12 through the area changing portion 16. For example, when the booth 10 is used indoors, air having a temperature and humidity adjusted by indoor air conditioning is automatically replaced with air inside the booth main body 12. For this reason, even in a case where air conditioning equipment is not attached to the booth 10 such as the ceiling portion 20, the air outside the booth 10 enters the inside of the booth 10 through the area changing portion 16. For this reason, the booth 10 according to the present embodiment prevents the inside of the booth main body 12 from becoming hot even in a hot season such as summer. Therefore, even when the booth 10 according to the present embodiment is used as, for example, a work booth or the like, installation of air conditioning equipment is not necessary, and an increase in cost of the booth 10 is prevented.

In addition, as described above, air flows between the inside and the outside of the booth main body 12 through the area changing portion 16. Thus, air is automatically replaced with air inside the booth main body 12. Therefore, the booth 10 according to the present embodiment prevents the odor from staying in the booth main body 12.

In the area changing portion 16 of the booth 10 according to the present embodiment, for example, the cylindrical body 30 (i.e., the first attenuating portion 301) of the condition 1, the cylindrical body 30 (i.e., the second attenuating portion 302) of the condition 2, and the cylindrical body 30 (i.e., the third attenuating portion 303) of the condition 3 are integrated. As described above, the cylindrical body 30 of the condition 1 makes the attenuation amount of sound at a particular frequency and frequencies n times (n is a natural number) the particular frequency smaller than the attenuation amount of sound at the other frequencies. In the cylindrical body 30 of the condition 2, the attenuation amount of sound at another particular frequency and frequencies n times said another frequency is smaller than the attenuation amount of sound at the other frequencies. In the cylindrical body 30 of the condition 3, the attenuation amount of sound at yet another particular frequency and frequencies n times said yet another particular frequency is smaller than an attenuation amount of sound at the other frequencies. For this reason, the area changing portion 16 obtains the attenuation characteristics of the sound shown in FIG. 10 by the principle of superimposition of the attenuation amounts (dB) of sound by the cylindrical body 30 under the condition 1, the condition 2, and the condition 3 shown in FIGS. 7 to 9.

Figure 10:
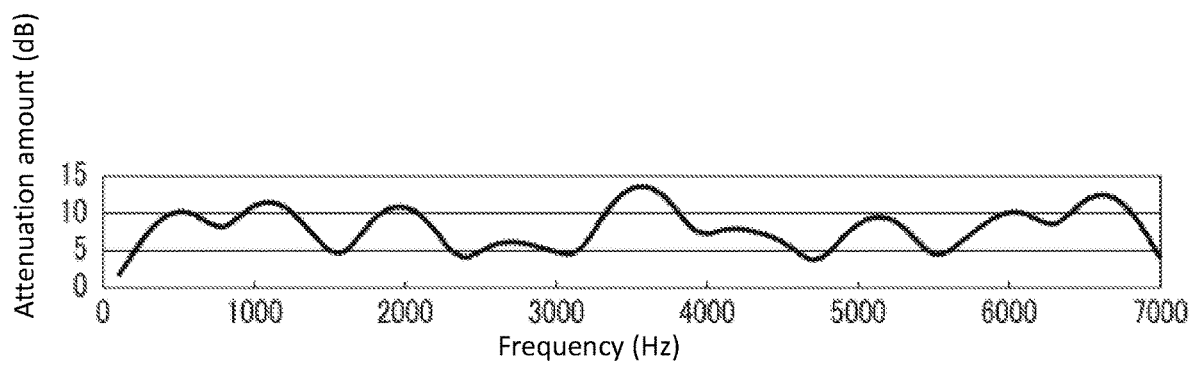
FIG. 10 is a graph showing the amount of attenuation of sound within a predetermined frequency range when the amount of attenuation of sound shown in FIGS. 7 to 9 is added.

As shown in FIG. 10, there are no frequencies at which the attenuation amount (dB) is 0 (dB) in a predetermined range of frequencies from 20 Hz to 7000 Hz in the area changing portion 16. Therefore, at any frequencies from 20 Hz to 7000 Hz, the sound pressure of the sound input to one end of the area changing portion 16 and output from the other end is always attenuated at the other end with respect to the one end. For example, in area changing portion 16, the sound at 800 Hz and frequencies of n times that frequency is not attenuated in the cylindrical body 30 (i.e., the first attenuating portion 301) under the condition 1, but is attenuated in the cylindrical body 30 (i.e., the second attenuating portion 302) under the condition 2 and the cylindrical body 30 (i.e., the third attenuating portion 303) in condition 3.

For example, in the area changing portion 16, the sound at 800 Hz and n times that frequency is not attenuated in the cylindrical body 30 (i.e., the first attenuating portion 301) under the condition 1, but is attenuated in the cylindrical body 30 (i.e., the second attenuating portion 302) under the condition 2 and the cylindrical body 30 (i.e., the third attenuating portion 303) under the condition 3. For example, in the area changing portion 16, the sound of 2450 Hz and n times that frequency is attenuated in the cylindrical body 30 under the condition 1 and the condition 2, and is not attenuated in the cylindrical body 30 under the condition 3.

In the present embodiment, sounds other than 800 Hz, 1450 Hz, 2450 Hz and sounds having frequencies n times as high as these frequencies, which pass through the area changing portion 16, are attenuated three times. On the other hand, the sounds of 800 Hz, 1450 Hz, 2450 Hz and n times higher frequencies passing through the area changing portion 16 are attenuated twice. Therefore, among the voices of the male and the female, the voices of 800 Hz, 1450 Hz, 2450 Hz, and the frequencies that are n times those frequencies reach the inside of the booth main body 12 after being attenuated in a case where the voices pass through the area changing portion 16 from the outside of the booth main body 12.

Therefore, when the flow passage of the air communicating the inside and outside of the booth main body 12 is formed by the area changing portion 16, the sound of each frequency caused by the male and female voices generated outside the booth main body 12 is attenuated when reaching the inside of the booth main body 12 through the area changing portion 16. In addition, in the area changing portion 16, the sizes of the reflection surfaces 1711, 1712, 1713 are appropriately formed, and the directions of the reflection surfaces 1711, 1712, 1713 are directed to the outside of the booth main body 12. For this reason, a part of sounds of the respective frequencies by the male and female voices generated outside the booth main body 12 is reflected by the reflection surfaces 1711, 1712, 1713 when passing through the area changing portion 16. Therefore, a part of the sound travelling towards the inside of the booth main body 12 from the outside of the booth main body 12 does not reach the inside of the booth main body 12. Further, the wall plate 121 of the booth 10 exhibits a sound absorbing or sound insulating function. Therefore, the inside of the booth 10 becomes a quiet individual room space compared with the outside of the booth 10. Therefore, a user of the booth 10 inside the booth 10 can perform, for example, work in a quiet environment.

In addition, the sound having each of the frequencies corresponding to male and female voices generated inside the booth main body 12 attenuates in a case where the sound reaches the outside of the booth main body 12 through the area changing portion 16. In the area changing portion 16, the sizes of the reflection surfaces 1721, 1722, 1723 are appropriately formed, and the directions of the reflection surfaces 1721, 1722, 1723 are directed to the inside of the booth main body 12. Therefore, a part of sounds of respective frequencies by male and female voices generated inside the booth main body 12 is reflected by the reflection surfaces 1721, 1722, 1723 when passing through the area changing portion 16. Therefore, a part of the sound traveling out from the inside to the outside of the booth main body 12 does not reach the outside of the booth main body 12. Further, the wall plate 121 of the booth 10 exhibits a sound absorbing or sound insulating function. Therefore, even if a large sound is generated in the booth 10, the sound propagates as a small sound to the outside of the booth 10 as compared with the inside of the booth 10. Therefore, for example, when a user of the booth 10 inside the booth 10 speaks in a web conference, a telephone call, or the like, it is possible to prevent the voice or sound in the booth 10 from leaking to the outside of the booth 10.

Preferably, the areas SA, SC, SE, SG of the first, third, fifth, and seventh areas 161, 163, 165, 167 of the area changing portion 16 are as small as possible, and the areas SB, SD, SF of the second, fourth, and sixth areas 162, 164, 166 are as large as possible. In such a case, the area changing unit 16 can increase an attenuation effect of sound propagation from the outside to the inside of the booth 10 and sound propagation from the inside to the outside of the booth 10.

Further, the area changing portion 16 can be formed such that each of the first reflection surfaces 1711, 1712, 1713 and the second reflection surfaces 1721, 1722, 1723 is large. In addition, the area changing portion 16 can direct the reflection surfaces 1711, 1712, 1713 toward the outside of the booth main body 12 and direct the reflection surfaces 1721, 1722, 1723 toward the inside of the booth main body 12. On the other hand, when the areas SA, SC, SE, SG of the first, third, fifth, and seventh areal portions 161, 163, 165, 167 are too small, air does not easily flow between the inside and the outside of the booth 10. For this reason, it is preferable that the areas SA, SC, SE, SG of the first, third, fifth, and seventh areal portions 161, 163, 165, 167 are adjusted to a size in which air easily flows between the inside and the outside of the booth 10 and an appropriate sound attenuation effect is obtained.

Figure 11:
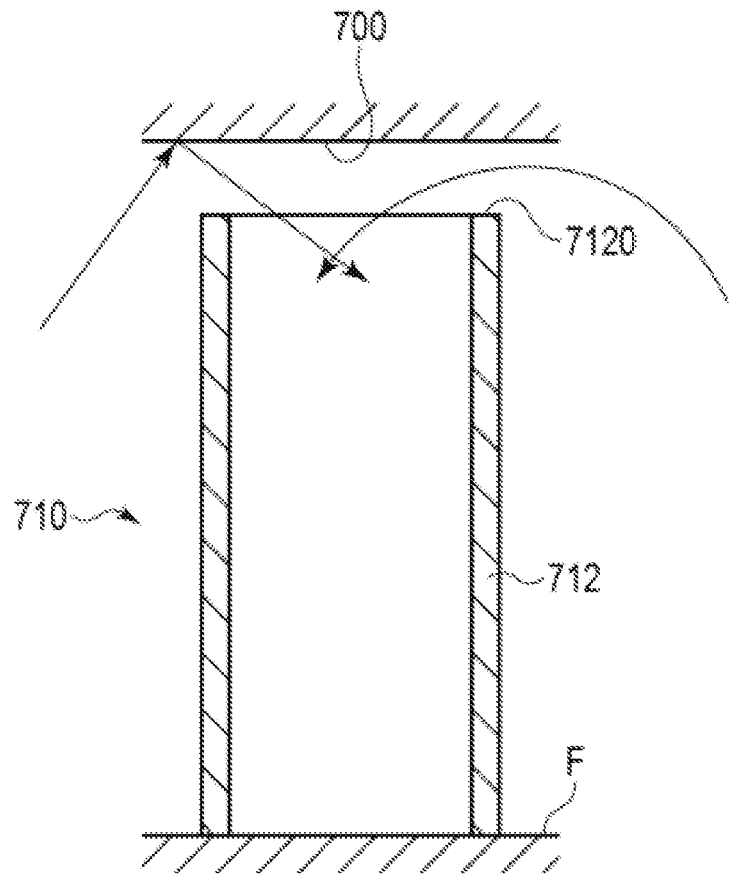
FIG. 11 is a schematic cross-sectional view of a booth according to a comparative example.

Here, with reference to FIG. 11, a booth 710 of a comparative example in which the area changing portion 16 is not provided in the upper portion of the booth main body 712 and a simple opening 7120 is provided, will be explained. In the booth 710 of the comparative example, air inside and outside the booth main body 712 can be easily replaced. However, the booth 710 of the comparative example does not have a sound attenuating mechanism and a sound reflecting mechanism such as the area changing portion 16 of the booth 10 of the present embodiment. For this reason, there is a possibility that the sound from the outside of the booth 710 of the comparative example is reflected from, for example, the ceiling 700 inside the building, passes between the opening 7120 and the ceiling 700, is diffracted, and enters the booth main body 712 through the opening 7120. At this time, a mechanism for absorbing or insulating sound does not exist in an upper portion of the booth main body 712.

In the present exemplary embodiment, areas SB, SD, SF of the second area portion 162, the fourth area portion 164, and the sixth area portion 166 of the area changing portion 16 illustrated in FIG. 4 are different from each other. The distance La between the first area portion 161 and the third area portion 163, the distance Lb between the third area portion 163 and the fifth area portion 165, and the distance Lc between the fifth area portion 165 and the seventh area portion 167 are different. Therefore, the booth 10 according to the present embodiment can attenuate the sound of each of the frequencies corresponding to the male and female voices entering from the outside to the inside of the booth main body 12 and from the inside to the outside of the booth main body 12, by the area changing portion 16. In addition, in the booth 10 according to the present embodiment, the sound emitted outside the booth main body 12 can be reflected toward the outside of the booth main body 12 by the reflection surfaces 1711, 1712, 1713. In addition, in the booth 10 according to the present embodiment, the sound emitted from the inside of the booth main body 12 can be reflected toward the inside of the booth main body 12 by the reflection surface 1721, 1722, 1723.

For this reason, in the booth 10 according to the present embodiment, air inside and outside the booth 10 can be easily exchanged, and a favorable sound absorbing or sound insulating effect can be obtained as compared with the booth 710 of the comparative example. As described above, according to the present embodiment, it is possible to provide the booth 10 that provides a quiet area without blocking the flow of air inside and outside.

In the present embodiment, an example has been described in which the reflection surfaces 1711, 1721 are provided in the second area portion n 162, the reflection surfaces 1712, 1722 are provided in the fourth area portion 164, and the reflection surfaces 1713, 1723 are provided in the sixth area portion 166. At least one of the reflection surfaces 1711, 1712, 1713, 1721, 1722, 1723 may be provided depending on a usage aspect such as an installation position of the booth 10. That is, at least one of the second, fourth, or sixth area portions 162, 164, 166 of the area changing portion 16 may have at least one of a first reflection surface that reflects the sound travelling to the inside of the booth main body 12 through the area changing portion 16 to the outside of the booth main body 12 or a second reflection surface that reflects the sound travelling to the outside of the booth main body 12 through the area changing portion 16 to the inside of the booth main body 12. In such a case, the area changing portion 16 can attenuate the sound pressure of the sound passing through the area changing portion 16 by greatly changing the acoustic impedances at the boundaries between the reflection surface that reflects the sound and the first, third, fifth, and seventh area portions 161, 163, 165 167 adjacent to the reflection surface. In addition, the area changing portion 16 can reflect sound in a desired direction by its reflection surface.

In the above description, an example of the area changing portion 16 in which the cylindrical body 30 under the condition 2 is integrated with or connected to the cylindrical body 30 under the condition 1, and the cylindrical body 30 under the condition 3 is integrated with or connected to the cylindrical body 30 under the condition 2 has been described. For example, the cylindrical body 30 under the condition 1 may be integrated with or connected to the cylindrical body 30 under the condition 2, and the cylindrical body 30 under the condition 3 may be integrated with or connected to the cylindrical body 30 under the condition 1. In this way, when the area changing portion 16 is formed by using a plurality of cylindrical bodies 30, the order of the cylindrical bodies 30 under the condition 1, condition 2, and condition 3 can be appropriately set.

Figure 12:
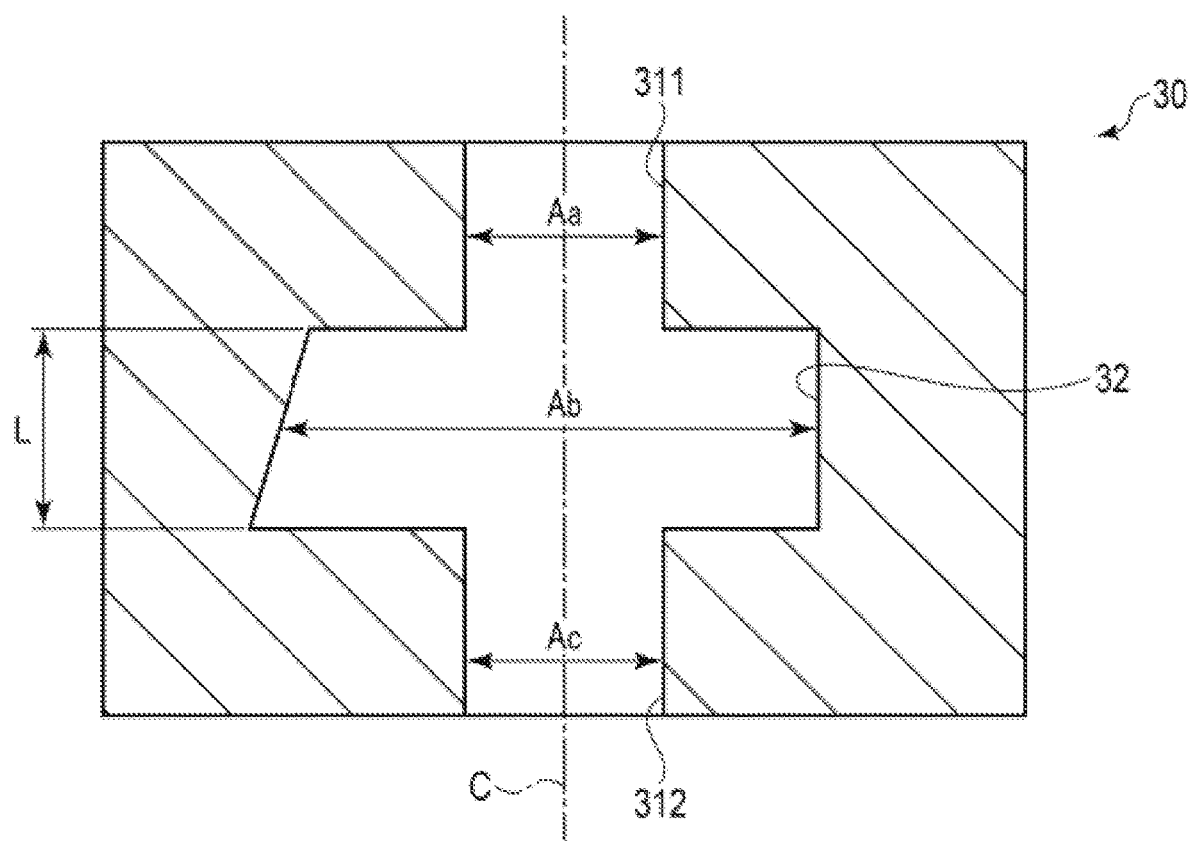
FIG. 12 is a schematic cross-sectional view showing a modified example of a cylindrical body which can be a part of an area changing portion of the booth shown in FIG. 4.

In the present embodiment, as shown in FIG. 5, the area Ab of the large area portion 32 of the cylindrical body 30 is constant along the direction corresponding to the length L. Alternatively, as shown in FIG. 12, the area Ab of the large area portion 32 may not be constant along that direction and is formed so as to approach the area Aa of the first small area portion 311 toward the upper side of the cylindrical body 30, for example. In such a case, the area changing portion 16 of the booth 10 may not be symmetrical with respect to the predetermined center axis C of the communication portion 14. When the area changing portion 16 is formed, the cylindrical body 30 shown in FIG. 12 and the cylindrical body 30 shown in FIG. 5 may be joined together.

Figure 13:
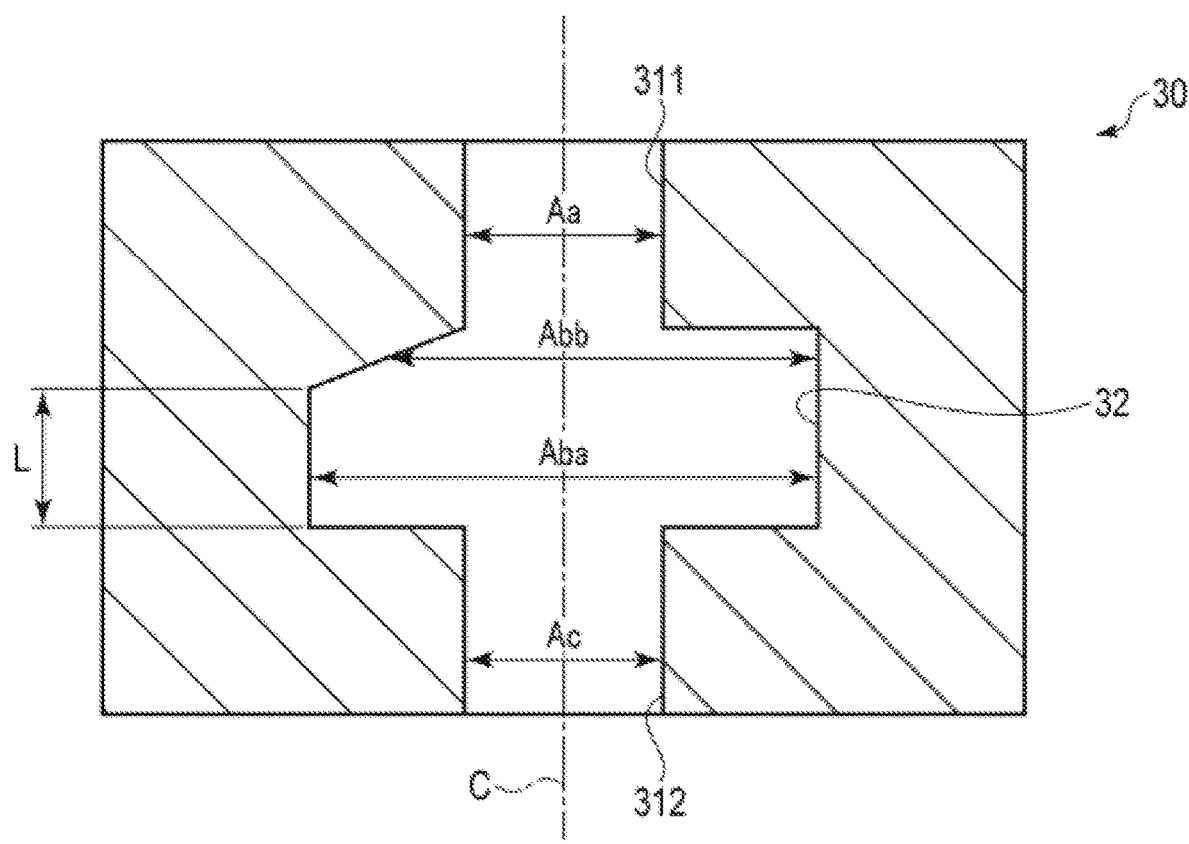
FIG. 13 is a schematic cross-sectional view illustrating another modified example of a cylindrical body that can be a part of an area changing portion of the booth illustrated in FIG. 4.

Further, as shown in FIG. 13, the area Ab of the large area portion 32 may have a constant area Aba at a position of a predetermined distance, and an area Abb that approaches the area Aa of the first small area portion 311 from the middle toward the first small area portion 311 on the upper side of the cylindrical body 30, for example. When the area changing portion 16 is formed, the cylindrical body 30 shown in FIG. 13 and the cylindrical body 30 shown in FIG. 5 may be combined. Further, the area changing portion 16 may be formed by integrating or joining the cylindrical body 30 shown in FIG. 12, the cylindrical body 30 shown in FIG. 13, and the cylindrical body 30 shown in FIG. 5.

Figure 14:
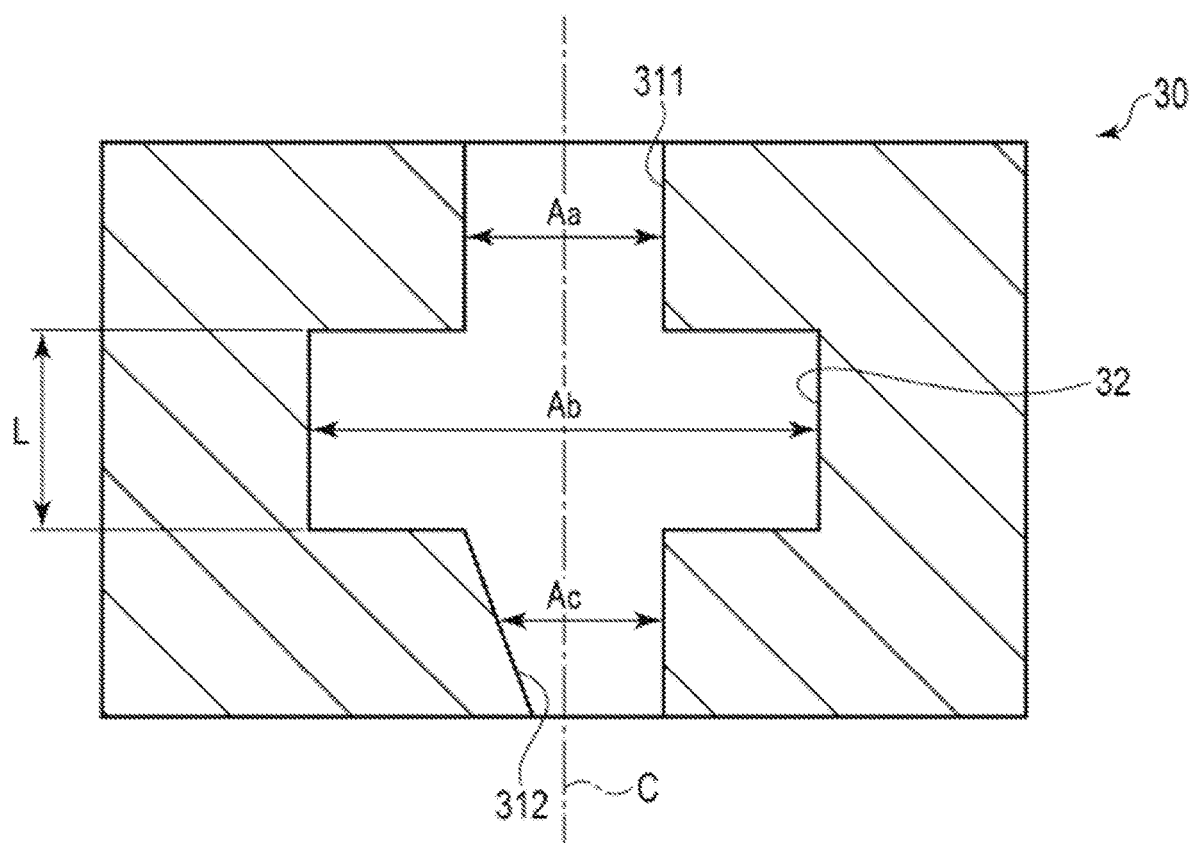
FIG. 14 is a schematic cross-sectional view showing still another modified example of a cylindrical body which can be a part of an area changing portion of the booth shown in FIG. 4.

In the present embodiment, the area Aa of the first small area portion 311 and the area Ac of the second small area portion 312 are the same in each cylindrical body 30 as shown in FIG. 5. Alternatively, as shown in FIG. 14, in each cylindrical body 30, the space area Aa of the first small area portion 311 and the space area Ac of the second small area portion 312 may be different. When the area changing portion 16 is formed, the cylindrical body 30 shown in FIG. 14 and the cylindrical body 30 shown in FIG. 5 may be combined. Further, the area changing portion 16 may be formed by integrating or joining the cylindrical body 30 shown in FIG. 12, the cylindrical body 30 shown in FIG. 13, the cylindrical body 30 shown in FIG. 14, and the cylindrical body 30 shown in FIG. 5. In this context, these space area (Aa, Ab, Ac) values correspond in general to volumes (spatial volumes) within the cylindrical body 30.

As described above, according to the present embodiment, it is possible to provide the booth 10 that provides a quiet area without blocking the flow of air inside and outside.

First Modified Example

A booth 10 according to a first modified example of the first embodiment will be described with reference to FIGS. 15 and 16.

As shown in FIGS. 1 and 4, in the booth 10 of the first embodiment, the area changing portion 16 is formed by integrating or connecting three cylindrical bodies 30 shown in FIG. 5. In the first modified example, as shown in FIG. 15, the booth 10 has two of the three cylindrical bodies 30 shown in FIG. 5, which are integrated or connected along the air flow direction to form the area changing portion 16.

Figure 15:
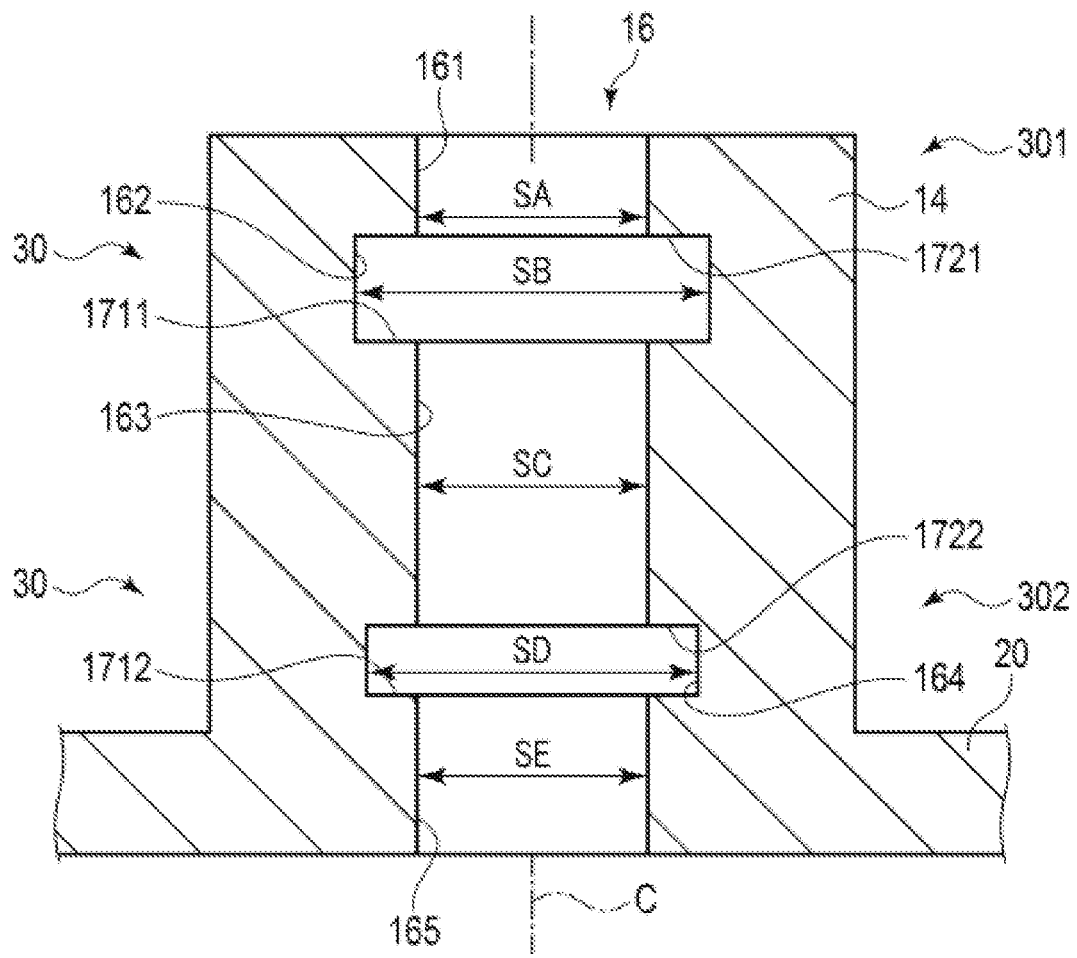
FIG. 15 is a schematic cross-sectional view illustrating a communication portion and an area changing portion of a booth according to a first modified example of a first embodiment.

As shown in FIG. 15, the area changing portion 16 of the booth 10 according to this modified example includes a first area portion 161, a second area portion 162 having an area SB larger than the area SA of the first area portion 161, a third area portion 163 having an area SC smaller than the area SB of the second area portion 162, a fourth area portion 164 having an area SD larger than the area SC of the third area portion 163, and a fifth area portion 165 having an area SE smaller than the area SD of the fourth area portion 164 in this order along the air flow direction. The areas SB and SD of the second area portion 162 and the fourth area portion 164 of the area changing portion 16 are different from each other, and the distance corresponding to the distance La between the first area portion 161 and the third area portion 163 and the distance corresponding to the distance Lb between the third area portion 163 and the fifth area portion 165 are different from each other.

Figure 16:
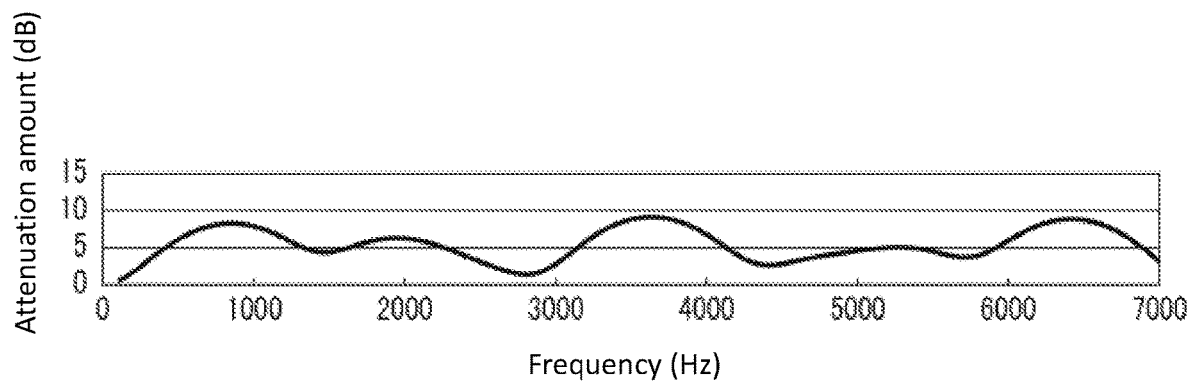
FIG. 16 is a graph showing an attenuation amount of sound within a predetermined frequency range of the area changing portion shown in FIG. 15.

The area changing portion 16 shown in FIG. 15 obtains the attenuation characteristics of the sound shown in FIG. 16 by the principle of superimposition of the attenuation amounts (dB) of the sound of the cylindrical body 30 under the condition 1 and the condition 2 shown in FIGS. 7 and 8.

As illustrated in FIG. 16, there is no frequencies at which the attenuation amount (dB) is 0 (dB) in a predetermined range of frequencies from 20 Hz to 7000 Hz. Therefore, at any frequencies from 20 Hz to 7000 Hz, the sound pressures of the sound passing through the area changing portion 16 are always attenuated.

Therefore, even if the booth 10 has an air flow passage communicating the inside and the outside of the booth main body 12, when the area changing portion 16 forms the flow passage, the sound of each frequency generated outside the booth main body 12 is attenuated when reaching the inside of the booth main body 12 through the communication portion 14. In addition, the sound having each frequency generated inside the booth main body 12 attenuates in a case where the sound reaches the outside of the booth main body 12 through the communication portion 14.

The sound attenuation amount of the area changing portion 16 depends on the number of the cylindrical bodies 30 connected to each other and the shape of the cylindrical body 30 forming the area changing portion 16.

In addition, a part of the sound generated outside the booth main body 12 is reflected by the reflection surfaces 1711, 1712 when passing through the area changing portion 16. Therefore, a part of the sound travelling toward the inside of the booth main body 12 from the outside of the booth main body 12 does not reach the inside of the booth main body 12. Further, the wall plate 121 of the booth 10 exhibits a sound absorbing or sound insulating function. Therefore, the inside of the booth 10 becomes a quiet individual room space compared with the outside of the booth 10. Therefore, a user, e.g., a worker inside the booth 10 can enjoy a quite environment.

In addition, a part of the sound generated inside the booth main body 12 is reflected by the reflection surfaces 1721, 1722 when passing through the area changing portion 16. Therefore, a part of the sound going out from the inside to the outside of the booth main body 12 does not reach the outside of the booth main body 12. Further, the wall plate 121 of the booth 10 exhibits a sound absorbing or insulating function. Therefore, even if a large sound is generated in the booth 10, the sound propagates as a small sound to the outside of the booth 10 as compared with the inside of the booth 10.

Therefore, the booth 10 according to the present modified example provides a quiet area without blocking the flow of air inside and outside.

In the present modified examination, the reflection surfaces 1711, 1721 are provided in the second area portion 162 and the reflection surfaces 1712, 1722 are provided in the fourth area portion 164. However, at least one of the reflection surfaces 1711, 1712, 1721, 1722 may be provided depending on a usage aspect such as an installation position of the booth 10. That is, at least one of the second and fourth area portions 162 and 164 of the area changing portion 16 may have at least one of a first reflection surface that reflects sound traveling toward the inside of the booth main body 12 through the area changing portion 16 to the outside of the booth main body 12 and a second reflection surface that reflects sound traveling toward the outside of the booth main body 12 through the area changing portion 16 to the inside of the booth main body 12. In such a case, the area changing portion 16 can attenuate the sound pressure of the sound passing through the area changing portion 16 by greatly changing the acoustic impedances at the boundaries between the reflection surface for reflecting the sound and the first, third, and fifth area changing portions 161, 163, 165 adjacent to the reflection surface. In addition, the area changing portion 16 can reflect sound in a desired direction by its reflection surface.

In the booth 10, the area changing portion 16 may be formed by integrally forming or connecting four or more cylindrical bodies 30 shown in FIG. 5.

Second Modified Example

Next, a booth 10 according to a second modified example of the first embodiment will be described with reference to FIG. 17.

Figure 17:
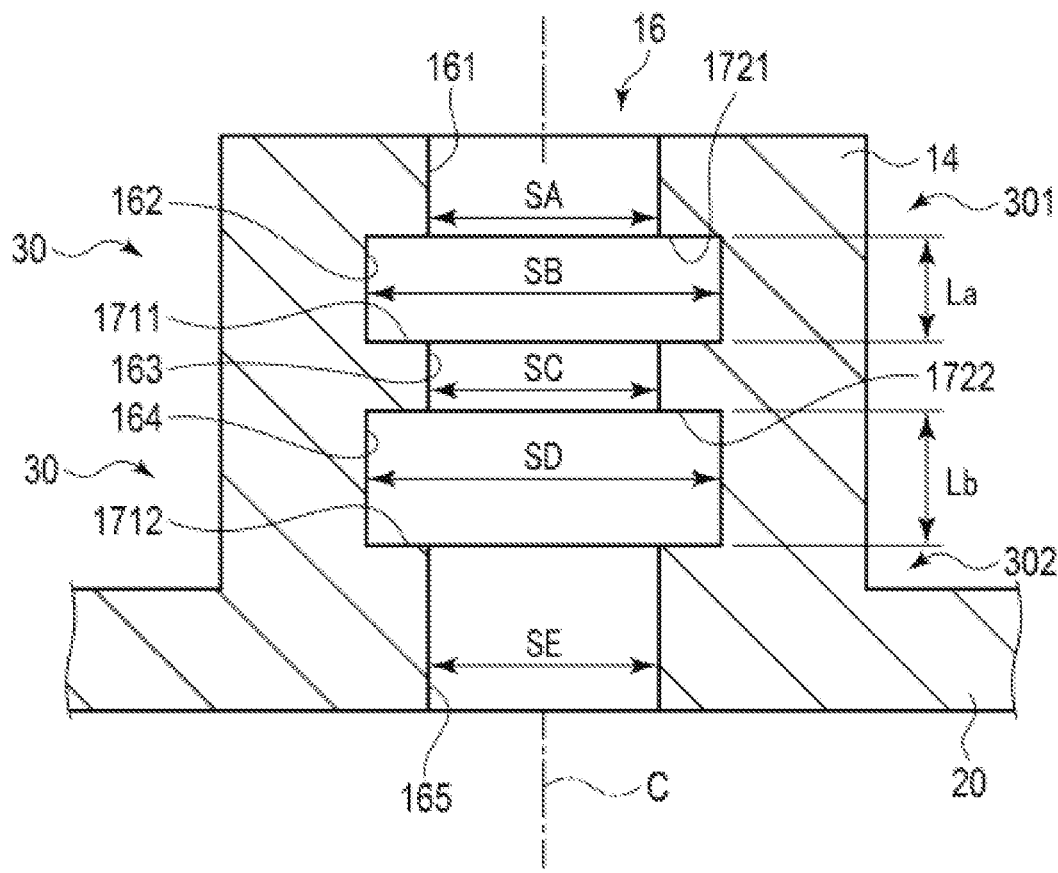
FIG. 17 is a schematic cross-sectional view illustrating a communication portion and an area changing portion of a booth according to a second modified example of a first embodiment.

As shown in FIG. 17, in the area changing portion 16 of the booth 10, an area SA of the first area portion 161 orthogonal to the center axis C, an area SC of the third area portion 163, and an area SE of the fifth area portion 165 are the same. In addition, in the area changing portion 16 of the booth 10, an area SB of the second area portion 162 and an area SD of the fourth area portion 164 orthogonal to the center axis C are the same. On the other hand, the distance La is smaller than the distance Lb. Therefore, based on Formula (1), the fundamental frequency of the sound that cannot be attenuated is different between the cylindrical body 30 including the second area portion 162 of the area changing portion 16 and the cylindrical body 30 including the fourth area portion 164.

Therefore, according to the principle of superposition, the area changing portion 16 of the booth 10 shown in FIG. 17 has a characteristic of attenuating sound at frequencies from 20 Hz to 7000 Hz as shown in FIG. 16, for example. Therefore, in a case where the distances La and Lb are different from each other, even in a case where the areas SB of the second area portion 162 and the areas SD of the fourth area portion 164 are the same, the area changing portion 16 of the booth 10 can attenuate sound having frequencies in the 20 Hz to 7000 Hz range passing through the area changing portion 16.

Third Modified Example

A booth 10 according to a third modified example of the first embodiment will be described with reference to FIG. 18.

Figure 18:
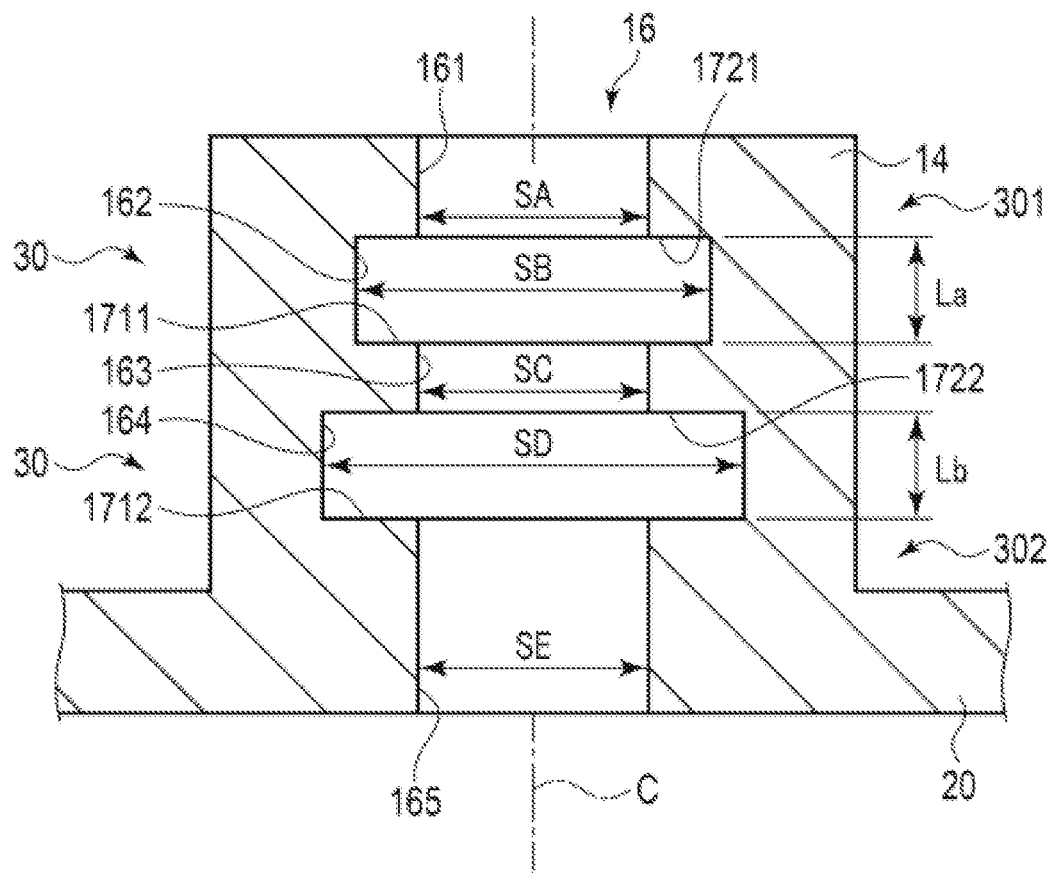
FIG. 18 is a schematic cross-sectional view illustrating a communication portion and an area changing portion of a booth according to a third modified example of a first embodiment.

In the area changing portion 16 of the booth 10 shown in FIG. 18, the distance La between the first area portion 161 and the third area portion 163 is the same as the distance Lb between the third area portion 163 and the fifth area portion 165. In the area changing portion 16 of the booth 10, the area SA of the first area portion 161 orthogonal to the center axis C, the area SC of the third area portion 163, and the area SE of the fifth area portion 165 are the same. However, in the area changing portion 16 of the booth 10, the area SB of the second area portion 162 and the area SD of the fourth area portion 164 orthogonal to the center axis C are different from each other. Therefore, based on Formula (1), the fundamental frequency of the sound that cannot be attenuated is different between the cylindrical body 30 including the second area portion 162 of the area changing portion 16 and the cylindrical body 30 including the fourth area portion 164.

Therefore, according to the principle of superposition, the area changing portion 16 of the booth 10 shown in FIG. 17 has a characteristic of attenuating sound at frequencies from 20 Hz to 7000 Hz as shown in FIG. 16, for example. Therefore, in a case where the areas SB of the second area portions 162 and the areas SD of the fourth area portions 164 are different from each other, even in a case where the distances La and Lb are the same as each other, the area changing portion 16 of the booth 10 can attenuate the sound at the frequencies from 20 Hz to 7000 Hz passing through the area changing portion 16.

According to the first embodiment including each modified example, as in the example of the booth 10 shown in FIGS. 17 and 18, the area changing portion 16 is formed by combining at least two cylindrical bodies 30. In the area changing portion 16, at least one of the area SB of the second area portion 162 or the area SD of the fourth area portion 164 may be different from at least one of the distance La or the distance Lb. With this configuration, the area changing portion 16 can obtain a characteristic of attenuating sound of frequencies from 20 Hz to 7000 Hz. Therefore, it is possible to suppress the sound pressure of the sound travelling towards the inside from the outside of the booth 10 through the area changing portion 16, and to suppress the sound pressure of the sound that is going out from the inside of the booth. Therefore, the booth 10 according to the present embodiment including each of the modified examples can provide a quiet area without blocking the flow of air inside and outside.

Second Embodiment

Figure 19:
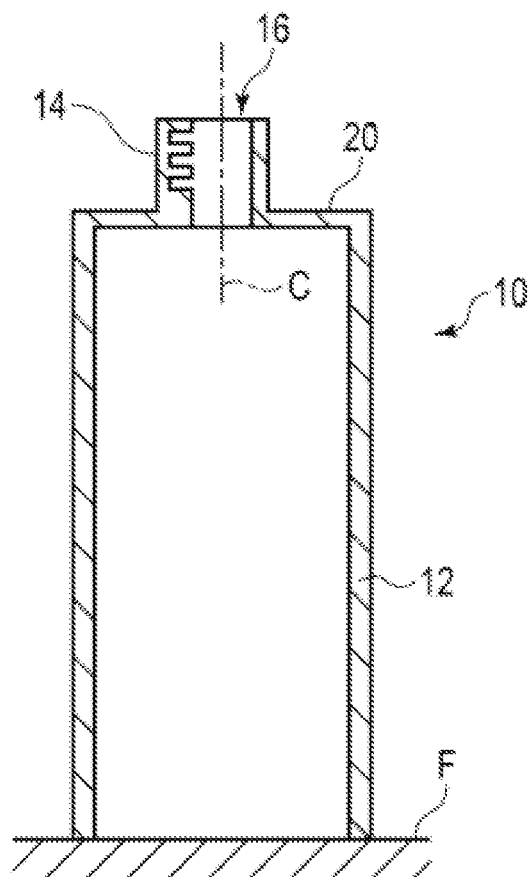
FIG. 19 is a schematic cross-sectional view of a booth according to a second embodiment.

Next, a second embodiment of the booth 10 will be described with reference to FIG. 19. The present embodiment is a further modified example of the first embodiment including each modified example.

As described above, according to Formula (1), the attenuation amount of the sound passing through the cylindrical body 30 does not depend on the shapes of the first small area portion 311, the second small area portion 312, and the large area portion 32. For this reason, as shown in FIG. 19, the area changing portion 16 of the booth 10 may not be symmetrical with respect to the predetermined central axis C of the communication portion 14.

The booth 10 according to the present embodiment can also provide a quiet area without blocking the flow of air inside and outside.

Third Embodiment

Next, a third embodiment of the booth 10 will be described with reference to FIG. 20. The present embodiment is a further modified example of the first embodiment and the second embodiment including each modified example.

As described above, in the booth 10 according to the first embodiment and the second embodiment, the communication portion 14 and the area changing portion 16 are provided in the ceiling portion 20 of the booth main body 12.

Figure 20:
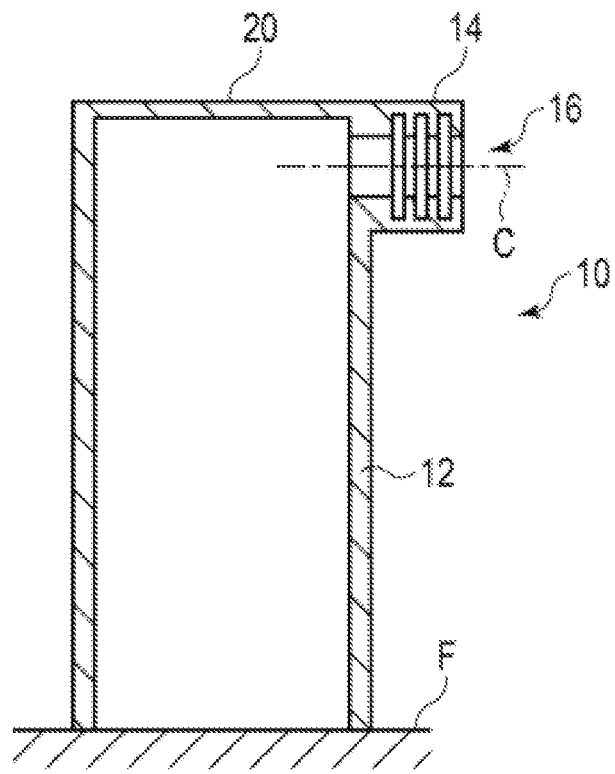
FIG. 20 is a schematic cross-sectional view of a booth according to a third embodiment.

As shown in FIG. 20, the communication portion 14 and the area changing portion 16 may be provided at a position away from the ceiling portion 20. It is preferable that the communication portion 14 and the area changing portion 16 are provided in an upper portion of the booth main body 12, i.e., a side wall plate 121.

The shape of the communication portion and the area changing portion 16 is, for example, the same as the shape shown in FIG. 4. The areas of the first to seventh area portions 161 to 167 of the area changing portion 16 of the booth 10 according to the present embodiment are areas of surfaces parallel to the floor F and orthogonal to the air flow direction.

The booth 10 according to the present embodiment can also provide a quiet area without blocking the flow of air inside and outside.

Fourth Embodiment

Next, a fourth embodiment of the booth 10 will be described with reference to FIG. 21. This embodiment is a further modified example of the first embodiment, the second embodiment, and the third embodiment including each modified example.

As described above, in the first and second embodiments, the communication portion 14 and the area changing portion 16 protruding outward with respect to the ceiling portion 20 of the booth main body 12 are provided. That is, as shown in FIGS. 1 and 4, the lower end of the area changing portion 16 is disposed on the ceiling portion 20 and the upper end of the area changing portion 16 is disposed outside the booth main body 12.

Figure 21:
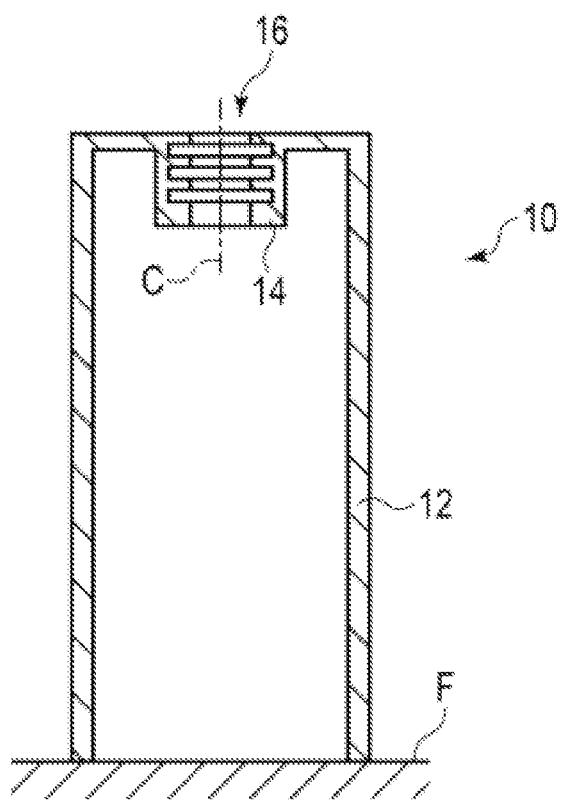
FIG. 21 is a schematic cross-sectional view of a booth according to a fourth embodiment.

As shown in FIG. 21, in the present embodiment, the lower end of the area changing portion 16 is disposed inside the booth main body 12, and the upper end of the area changing portion 16 is disposed on the ceiling portion 20 of the booth main body 12. As described above, a part of the communication portion 14 and the area changing portion 16 may not protrude outward from the ceiling portion 20.

In the third embodiment shown in FIG. 20, the communication portion 14 and the area changing portion 16 protruding outward with respect to the upper portion of the booth main body 12 are provided. Alternatively, the communication portion 14 and the area changing portion 16 may be arranged to not protrude to the outside of the booth main body 12 by, for example, disposing the area changing portion 16 inside the booth main body 12 along the side wall plate 121.

The booth 10 according to the present embodiment can also provide a quiet area without blocking the flow of air inside and outside.

Fifth Embodiment

A booth 10 according to a fifth embodiment of the present disclosure is described below with reference to FIG. 22 and FIG. 23. FIG. 23 depicts a region XXIII of FIG. 22. The booth 10 according to the fifth embodiment is a modified example of the booth 10 described for the first to fourth embodiments. The components or aspects having the same functions and/or properties as those of the booth 10 already described for the first to fourth embodiments are denoted by the same reference symbols, and additional description thereof is omitted.

Figure 22:
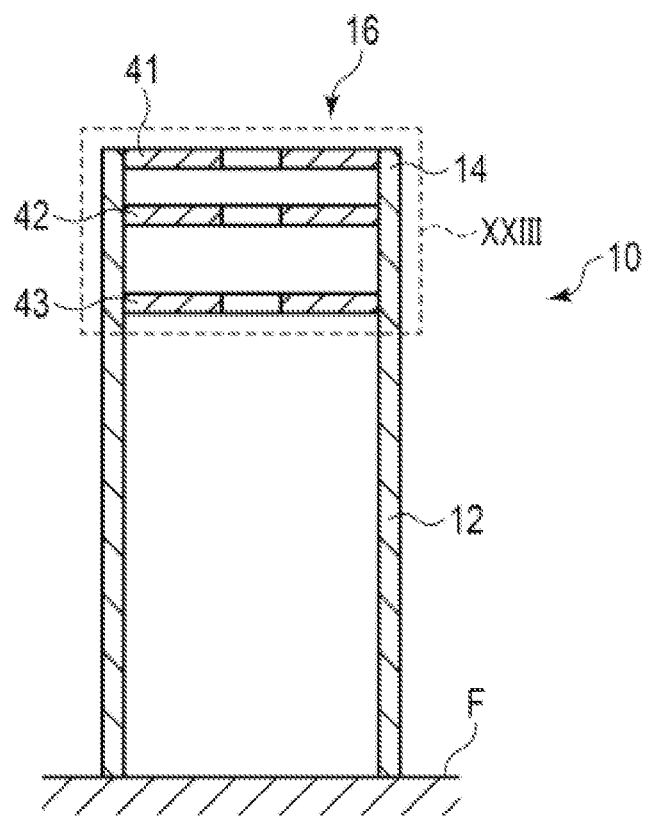
FIG. 22 is a schematic cross-sectional view of a booth according to a fifth embodiment.
Figure 23:
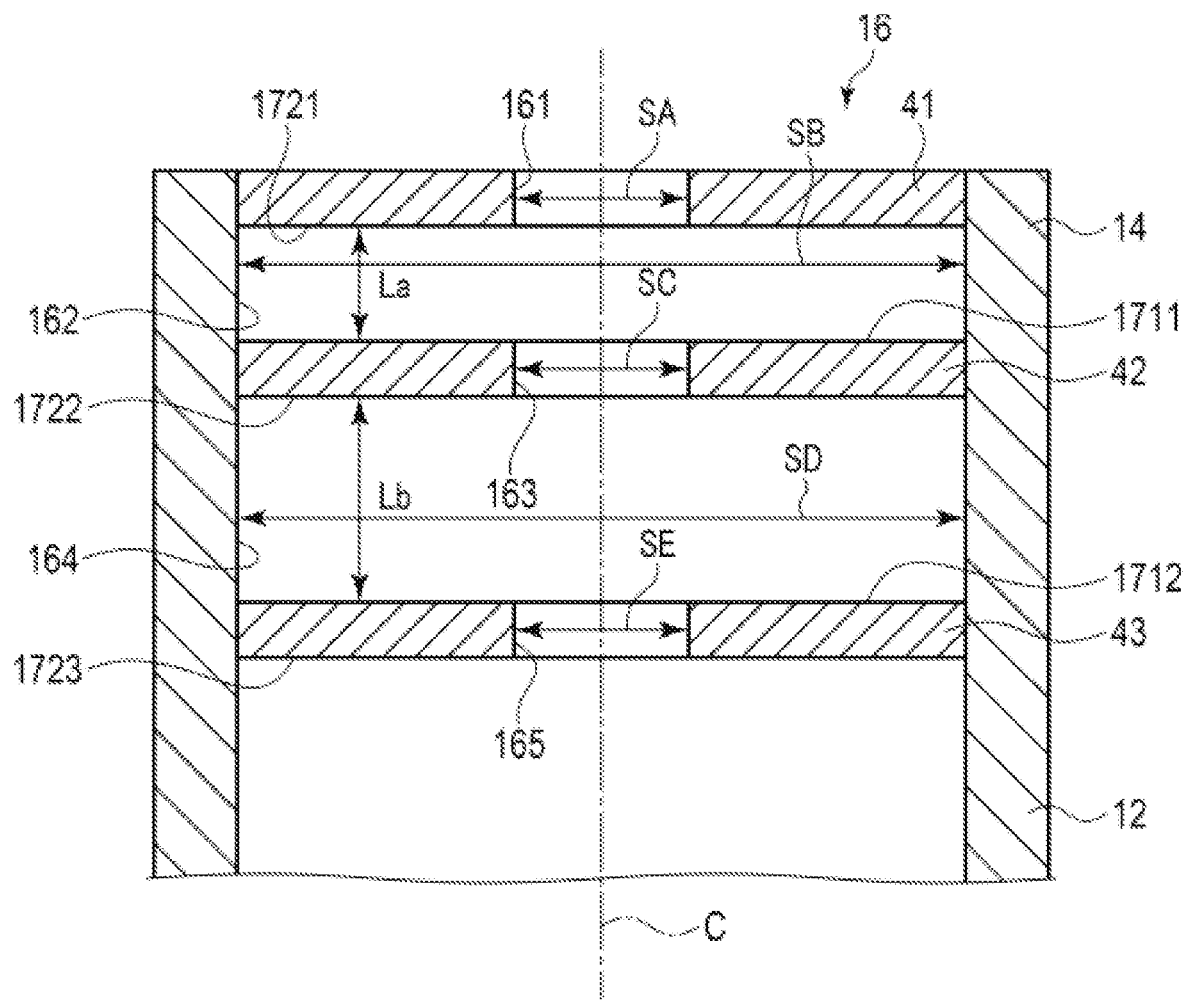
FIG. 23 is an enlarged view of a position indicated by region XXIII in FIG. 22.

As shown in FIGS. 22 and 23, the ceiling portion 20 is not present in the booth main body 12 of the booth 10 according to the present embodiment. In the present embodiment, a position opposite to the floor surface F side in the booth main body 12 is opened as the communication portion 14. The area changing portion 16 is provided in the In the present embodiment, the area changing portion 16 includes a first annular body 41, a second annular body 42, and a third annular body 43 in order from the upper side to the lower side. Each of the first annular body 41, the second annular body 42, and the third annular body 43 has a ring shape having an opening at the center thereof. The openings of the first annular body 41, the second annular body 42, and the third annular body 43 have a circle, an ellipse, an n-gonal shape (n is three or more), or the like. The first annular body 41, the second annular body 42, and the third annular body 43 are formed in, for example, a plate shape. As described above, the area changing portion 16 may not be integrated.

The first annular body 41 has an area SA of the first area portion 161. The second annular body 42 has an area SC of the third area portion 163. The third annular body 43 has an area SE of the fifth area portion 165. Further, the area changing portion 16 has an area SB of the second area portion 162 between the first annular body 41 and the second annular body 42. The area changing portion 16 has an area SD of a fourth area portion 164 between the second annular body 42 and the third annular body 43.

The areas SB and SD of the second area portion 162 and the fourth area portion 164 are the same, but the distance La for the second area portion 162 along the air flow direction (i.e., the distance between the first annular body 41 and the second annular body 42) is shorter than the distance Lb of the fourth area portion 164 along the air flow direction (i.e., the distance between the second annular body 42 and the third annular body 43).

Therefore, the area changing portion 16 according to the present embodiment has the same structure as the area changing portion 16 shown in FIG. 17. Accordingly, the area changing portion 16 according to the present embodiment attenuates a sound entering the inside from the outside of the booth main body 12 and attenuates a sound going out from the inside of the booth main body 12 to the outside.

The second annular body 42 of the area changing portion 16 has a reflection surface 1711 that reflects a part of a sound entering the booth main body 12 from the outside through the area changing portion 16 inside the communication portion 14 toward the outside of the communication portion 14. The third annular body 43 of the area changing portion 16 has a reflection surface 1712 that reflects a part of a sound entering the booth main body 12 from the outside through the area changing portion 16 inside the communication portion 14 toward the outside of the communication portion 14.

Therefore, the sound travelling towards the inside of the booth main body 12 from the outside is reflected by the reflection surfaces 1711, 1712. Therefore, the area changing portion 16 can not only attenuate the sound that enters the booth main body 12 from outside but also reduce the sound by sound reflection.

The first annular body 41 of the area changing portion 16 has a reflection surface 1721 that reflects a part of a sound going out of the booth main body 12 through the area changing portion 16 outside the communication portion 14 from the inside toward the inside of the communication portion 14. The second annular body 42 of the area changing portion 16 has a reflection surface 1722 that reflects a part of a sound going out of the booth main body 12 through the area changing portion 16 outside the communication portion 14 from the inside toward the inside of the communication portion 14. The third annular body 41 of the area changing portion 16 has a reflection surface 1723 that reflects a part of a sound going out of the booth main body 12 through the area changing portion 16 outside the communication portion 14 from the inside toward the inside of the communication portion 14, for example.

Therefore, the sound going out from the inside to the outside of the booth main body 12 is reflected by the reflection surfaces 1721, 1722. For this reason, the area changing portion 16 can not only attenuate the sound going out from the inside of the booth main body 12 but also reduce the sound by sound reflection.

The booth 10 according to the present embodiment can also provide a quiet area without blocking the flow of air inside and outside.

In the area changing portion 16 according to the present embodiment, it is sufficient that the plate-like members formed as the first annular body 41, the second annular body 42, and the third annular body 43 are fixed to, for example, an upper portion of the booth main body 12. For this reason, in the booth 10 according to the present embodiment, the area changing unit 16 is easily assembled at the installation place of the booth 10.

According to the booth 10 of at least one embodiment described above, it is possible to provide a quiet area without blocking the flow of inside and outside air.

While certain embodiments have been described, these embodiments have been presented by way of example only, and are not intended to limit the scope of the invention. Indeed, the novel embodiments described herein may be embodied in a variety of other forms; furthermore, various omissions, substitutions and changes in the form of the embodiments described herein may be made without departing from the spirit of the inventions. These embodiments and modifications thereof are included in the scope and gist of the invention and are included in the invention described in the claims and the equivalent scope thereof.

What is claimed is:

1. A booth comprising:
one or more wall plates surrounding an internal space;
a ceiling plate connected to the wall plates and above the internal space; and
a communication portion connected to either the ceiling plate or an upper part of one of the wall plates and through which air flows between the internal space and an outside of the booth, wherein
the communication portion includes a plurality of area portions arranged along an air flow direction and each having an opening through which the air flows, the area portions including at least first, second, third, fourth, and fifth portions in this order from the outside of the booth towards the internal space,
a first area of the opening of the first portion that is perpendicular to the air flow direction is smaller than a second area of the opening of the second portion that is perpendicular to the air flow direction,
a third area of the opening of the third portion that is perpendicular to the air flow direction is smaller than the second area,
a fourth area of the opening of the fourth portion that is perpendicular to the air flow direction is greater than the third area, and
a fifth area of the opening of the fifth portion that is perpendicular to the air flow direction is smaller than the fourth area.

2. The booth according to claim 1, wherein the communication portion includes a first surface between the first and second portions and facing the internal space.

3. The booth according to claim 2, wherein the communication portion includes a second surface between the second and third portions and facing a direction away from the internal space.

4. The booth according to claim 1, wherein the communication portion is connected to the ceiling plate at a center thereof in a direction perpendicular to the air flow direction.

5. The booth according to claim 4, wherein the communication portion protrudes from the ceiling upward.

6. The booth according to claim 4, wherein the communication portion protrudes from the ceiling downward.

7. The booth according to claim 1, wherein the communication portion is connected to the upper portion of one of the wall plates.

8. The booth according to claim 7, wherein the communication portion protrudes from the upper portion of one of the wall plates toward the outside of the booth.

9. The booth according to claim 7, wherein the communication portion protrudes from the upper portion of one of the wall plates towards the internal space.

10. The booth according to claim 1, wherein in the air flow direction, a first length of the second portion is greater than a second length of the fourth portion.

11. The booth according to claim 1, wherein in the air flow direction, a first length of the second portion is smaller than a second length of the fourth portion.

12. The booth according to claim 1, wherein
the area portions further include a sixth portion between the fifth portion and the internal space, and
a sixth area of the opening of the sixth portion that is perpendicular to the air flow direction is greater than the fifth area.

13. The booth according to claim 12, wherein in the air flow direction, a first length of the second portion is greater than a second length of the fourth portion, and the second length is greater than a third length of the sixth portion.

14. The booth according to claim 1, wherein the first area is equal to the third and fifth areas.

15. The booth according to claim 14, wherein the second area is greater than the fourth area.

16. The booth according to claim 14, wherein the second area is smaller than the fourth area.

17. The booth according to claim 14, wherein the second area is equal to the fourth area.

18. The booth according to claim 1, wherein the opening of each of the area portions has a cylindrical shape.

19. The booth according to claim 18, wherein a center of the opening of each of the area portions is on a line that is parallel to the air flow direction.

* * * * *